US010190929B2

(12) United States Patent
Sato et al.

(10) Patent No.: US 10,190,929 B2
(45) Date of Patent: Jan. 29, 2019

(54) PRESSURE SENSOR DEVICE AND PRESSURE SENSOR DEVICE MANUFACTURING METHOD

(71) Applicant: FUJI ELECTRIC CO., LTD., Kawasaki-shi (JP)

(72) Inventors: Eisuke Sato, Matsumoto (JP); Shigeru Shinoda, Matsumoto (JP); Kimihiro Ashino, Matsumoto (JP)

(73) Assignee: FUJI ELECTRIC CO., LTD., Kawasaki-Shi, Kanagawa (JP)

(*) Notice: Subject to any disclaimer, the term of this patent is extended or adjusted under 35 U.S.C. 154(b) by 352 days.

(21) Appl. No.: 14/821,543

(22) Filed: Aug. 7, 2015

(65) Prior Publication Data
US 2016/0076960 A1     Mar. 17, 2016

(30) Foreign Application Priority Data
Sep. 17, 2014   (JP) ................................. 2014-189476

(51) Int. Cl.
| | |
|---|---|
| *G01L 9/00* | (2006.01) |
| *B21J 5/08* | (2006.01) |
| *B21K 21/12* | (2006.01) |
| *G01L 19/00* | (2006.01) |
| *G01L 19/14* | (2006.01) |
| *G01L 19/06* | (2006.01) |

(52) U.S. Cl.
CPC .............. *G01L 9/0042* (2013.01); *B21J 5/08* (2013.01); *B21K 21/12* (2013.01); *G01L 19/0038* (2013.01); *G01L 19/143* (2013.01); *G01L 19/0627* (2013.01)

(58) Field of Classification Search
CPC ......... G01L 9/0042; G01L 9/008; G01L 7/00; G01L 13/025; G01L 19/0084; G01L 19/0038; G01L 19/143; G01L 19/0627; B21K 21/12; B21J 5/08
USPC .................. 73/723, 715, 716, 717, 753, 700
See application file for complete search history.

(56) References Cited

U.S. PATENT DOCUMENTS

| | | | | |
|---|---|---|---|---|
| 6,186,009 B1 * | 2/2001 | Miyano | ..................... | G01L 9/06 73/756 |
| 7,370,536 B2 * | 5/2008 | Ueyanagi | ............ | G01L 19/0084 73/715 |
| 7,412,894 B2 * | 8/2008 | Ueyanagi | ............ | G01L 19/0084 73/753 |

(Continued)

FOREIGN PATENT DOCUMENTS

| | | |
|---|---|---|
| JP | H10-78365 A | 3/1998 |
| JP | 2000-171319 A | 6/2000 |

(Continued)

*Primary Examiner* — Lisa Caputo
*Assistant Examiner* — Nigel Plumb
(74) *Attorney, Agent, or Firm* — Rabin & Berdo, P.C.

(57) ABSTRACT

Provided are a pressure sensor device and method for making the same. A base member and a pressure sensor chip are joined so that a pressure receiving portion is aligned with a through hole. A pressure introduction unit and the base member are positioned and joined so that through holes thereof are continuous. The pressure introduction unit has a stepped portion in an end portion on an opened end side, and has a protruding portion protruding from the stepped portion to the base member side in an end portion.

20 Claims, 12 Drawing Sheets

(56) References Cited

U.S. PATENT DOCUMENTS

| | | | | |
|---|---|---|---|---|
| 2002/0144554 | A1* | 10/2002 | Ueyanagi | G01L 19/0084 |
| | | | | 73/700 |
| 2005/0087020 | A1 | 4/2005 | Ueyanagi et al. | |
| 2006/0213276 | A1 | 9/2006 | Ueyanagi et al. | |
| 2006/0243054 | A1* | 11/2006 | Saito | G01L 19/0084 |
| | | | | 73/754 |
| 2008/0054384 | A1* | 3/2008 | Uematsu | G01L 19/0084 |
| | | | | 257/415 |

FOREIGN PATENT DOCUMENTS

| | | |
|---|---|---|
| JP | 2000-214028 A | 8/2000 |
| JP | 4839648 B | 12/2001 |
| JP | 2006-266818 A | 10/2006 |
| JP | 5278448 B | 9/2013 |

\* cited by examiner

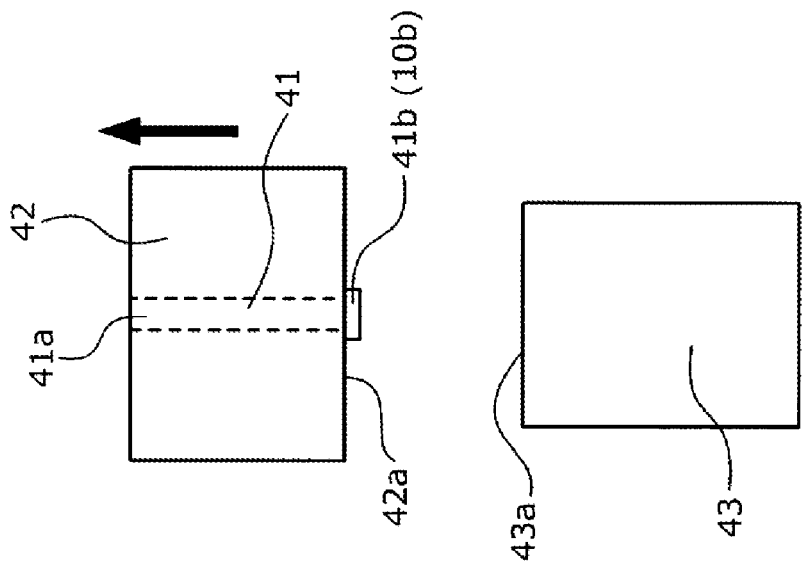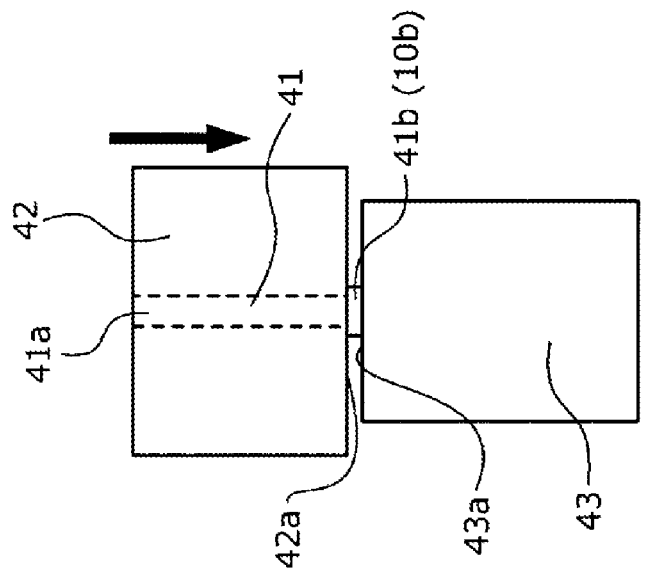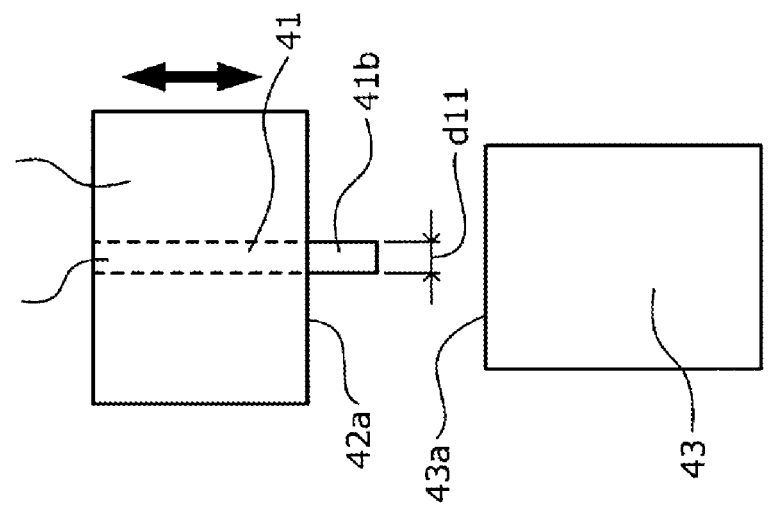

PRESSURE SENSOR DEVICE AND PRESSURE SENSOR DEVICE MANUFACTURING METHOD

CROSS-REFERENCE TO RELATED APPLICATION

This application claims the benefit of foreign priority of Japanese application 2014-189476, filed on Sep. 17, 2014. The disclosure of this earlier application is hereby incorporated herein by reference.

BACKGROUND OF THE INVENTION

1. Field of the Invention

The present invention relates to a pressure sensor device and a pressure sensor device manufacturing method.

2. Description of the Background Art

Generally, a semiconductor pressure sensor chip that utilizes a piezoresistance effect is used as a sensor element in a pressure sensor device that measures pressure by being attached to a transmission oil seal block, hydraulic actuator block, or the like, of an internal combustion engine or the like. The semiconductor pressure sensor is of a configuration wherein a multiple of semiconductor strain gauges are connected in a bridge on a diaphragm made of a material having a piezoresistance effect, such as monocrystalline silicon. When the diaphragm is distorted by pressure change, the gauge resistance of the semiconductor strain gauge changes in accordance with the amount of distortion, and the amount of the change is extracted from the bridge circuit as a voltage signal.

At present, a device wherein a pressure sensor chip incorporating a diaphragm, a piezoresistance element, an amplifier circuit, and various kinds of regulator circuit is joined to a base member so that the diaphragm is aligned with a through hole of the base member is publicly known as a pressure sensor device (for example, refer to Japanese Patent No. 4,839,648, Japanese Patent No. 5,278,448, and JP-A-10-78365). When using this kind of pressure sensor device in a high pressure zone, it is necessary that a pressure introduction unit joined to the base member is configured of a metal material. Also, an adhesive (for example, a silicon (Si) series adhesive) is used in the joining of the pressure introduction unit and a resin case in which the pressure sensor chip is housed, so that the pressure sensor chip does not detect thermal contraction of the resin case as a pressure change.

SUMMARY OF THE INVENTION

As a joining member that can be used in the joining of the pressure introduction unit and resin case, and that can withstand hydraulic measurement wherein high pressure (in the region of, for example, 10 MPa) is exerted, or the like, there is, for example, an epoxy resin. However, when using an epoxy resin as the joining member of the pressure introduction unit and resin case, it is necessary to use a metal having a thermal expansion coefficient as near as possible to the thermal expansion coefficient of the pressure sensor chip as the metal material of the pressure introduction unit. As this kind of metal, there is, for example, 42 alloy, but as the price thereof is high, expense is incurred when a large amount is used.

This kind of problem can be avoided by configuring the pressure introduction unit of a resin material such as polyphenylene sulfide (PPS). However, it has been confirmed by the inventors that it is difficult to select an adhesive that can withstand a pressure of in the region of 5 MPa or more, that is not adversely affected by thermal stress accompanying the thermal contraction of the pressure introduction unit or resin case, and that does not cause characteristic fluctuation, as the joining member used in the joining of the pressure introduction unit and resin case.

The invention, in order to eliminate the problems of the heretofore described existing technology, has an object of providing a pressure sensor device and pressure sensor device manufacturing method such that cost can be reduced.

In order to resolve the heretofore described problems, thereby achieving the aim of the invention, a pressure sensor device according to a first aspect of the invention is formed of a pressure sensor cell including a semiconductor pressure sensor chip, a base member, a pressure introduction unit, and a resin case, and has the following characteristics. The semiconductor pressure sensor chip has a pressure receiving portion. The base member has a through hole that penetrates a first surface and a second surface. The pressure introduction unit is formed of metal having a through hole that penetrates a first surface and a second surface. The resin case has a signal terminal that extracts an electrical signal from the semiconductor pressure sensor chip. Further, the semiconductor pressure sensor chip is joined to the second surface of the base member in a state wherein the pressure receiving portion is aligned with the through hole of the base member. The second surface of the pressure introduction unit is joined across a metal material to the first surface of the base member in a state wherein the through hole of the pressure introduction unit connects with the through hole of the base member. The pressure introduction unit has a stepped portion protruding outward in an end portion of the pressure introduction unit on an opened end side in which the through hole is opened and a protruding portion protruding from the stepped portion to the base member side. Furthermore, the pressure introduction unit is integrated with the resin case in a state wherein a surface of the stepped portion on the side opposite to the opened end side is in contact with the resin case. The wall thickness of the protruding portion of the pressure introduction unit is of a dimension smaller than the height of the stepped portion.

Also, in order to resolve the heretofore described problems, thereby achieving the aim of the invention, a pressure sensor device according to a second aspect of the invention is formed of a pressure sensor cell including a semiconductor pressure sensor chip, a base member, a pressure introduction unit, and a resin case, and has the following characteristics. The semiconductor pressure sensor chip has a pressure receiving portion. The base member has a through hole that penetrates a first surface and a second surface. The pressure introduction unit is formed of metal having a through hole that penetrates a first surface and a second surface. The resin case has a signal terminal that extracts an electrical signal from the semiconductor pressure sensor chip. Further, the semiconductor pressure sensor chip is joined to the second surface of the base member in a state wherein the pressure receiving portion is aligned with the through hole of the base member. The second surface of the pressure introduction unit is joined across a metal material to the first surface of the base member in a state wherein the through hole of the pressure introduction unit connects with the through hole of the base member. The pressure introduction unit has a stepped portion protruding outward in an end portion of the pressure introduction unit on an opened end side in which the through hole is opened. The pressure introduction unit is integrated with the resin case in a state wherein a surface of the stepped portion on the side opposite to the opened end side is in contact with the resin case and at least a corner portion on the opened end side of an end portion of the stepped portion is covered by the resin case.

Also, in order to resolve the heretofore described problems, thereby achieving the aim of the invention, a pressure sensor device according to a third aspect of the invention is formed of a pressure sensor cell including a semiconductor pressure sensor chip, a base member, a pressure introduction unit, a resin case, and a capacitor, and has the following characteristics. The semiconductor pressure sensor chip has a pressure receiving portion. The base member has a through hole that penetrates a first surface and a second surface. The pressure introduction unit is formed of metal having a through hole that penetrates a first surface and a second surface. The resin case has a signal terminal that extracts an electrical signal from the semiconductor pressure sensor chip. The capacitor is connected to the signal terminal. Further, the semiconductor pressure sensor chip is joined to the second surface of the base member in a state wherein the pressure receiving portion is aligned with the through hole of the base member. The second surface of the pressure introduction unit is joined across a metal material to the first surface of the base member in a state wherein the through hole of the pressure introduction unit connects with the through hole of the base member. The pressure introduction unit has a stepped portion protruding outward in an end portion of the pressure introduction unit on an opened end side in which the through hole is opened, and is integrated with the resin case in a state wherein a surface of the stepped portion on the side opposite to the opened end side is in contact with the resin case. The capacitor is embedded in a portion of the resin case opposing the stepped portion of the pressure introduction unit.

Also, the pressure sensor device according to the second or third aspect of the invention is characterized in that the pressure introduction unit has a protruding portion protruding from the stepped portion to the base member side.

Also, the pressure sensor device according to the first aspect of the invention is characterized in that the pressure introduction unit is integrated with the resin case in a state covered by the resin case from a portion of the protruding portion on the stepped portion side to the stepped portion.

Also, the pressure sensor device according to the first aspect of the invention is characterized in that the pressure introduction unit is integrated with the resin case in a state wherein a portion of the protruding portion on the base member side is distanced from the resin case.

Also, the pressure sensor device according to the first aspect of the invention is characterized in that a corner portion of an end portion of the stepped portion is chamfered.

Also, the pressure sensor device according to the first aspect of the invention is characterized in that a portion of the resin case in contact with the stepped portion protrudes further outward than an end surface of the stepped portion.

Also, the pressure sensor device according to the eighth aspect of the invention is characterized in that the portion of the resin case protruding further outward than an end surface of the stepped portion forms a support portion with which another member integrated with the pressure introduction unit comes into contact.

Also, the pressure sensor device according to the first aspect of the invention is characterized in that the pressure introduction unit is made of 42 alloy.

Also, the pressure sensor device according to the first aspect of the invention is characterized in that the pressure introduction unit and signal terminal are integrated with the resin case by resin molding.

Also, a pressure sensor device according to a twelfth aspect of the invention includes the pressure sensor cell described in the first aspect of the invention, a connector member, and a coupling member, and furthermore, has the following characteristics. The connector member includes a disposition portion in which the pressure sensor cell is disposed, one end is electrically connected to a signal terminal of the pressure sensor cell, and the other end is integrally molded with a signal terminal protruding to the exterior. The coupling member includes a screw portion having a through hole and a storage portion, having a fixing portion that fixes the connector member, in which the pressure sensor cell disposed in the connector member is stored. Further, the pressure sensor cell is disposed in the connector member so that an aperture in the first surface of the pressure introduction unit is opened. The signal terminal of the pressure sensor cell and the signal terminal integrally formed with the connector member are electrically connected. The through hole of the screw portion connects with the through hole of the pressure introduction unit. A space between the pressure introduction unit and coupling member is sealed with a sealing agent.

Also, in order to resolve the heretofore described problems, thereby achieving the aim of the invention, a pressure sensor device manufacturing method according to a thirteenth aspect of the invention is a method of manufacturing a pressure sensor device formed of a pressure sensor cell including a semiconductor pressure sensor chip, a base member, a pressure introduction unit, and a resin case, and has the following characteristics. The semiconductor pressure sensor chip has a pressure receiving portion for converting pressure into an electric signal. The base member has a through hole that penetrates a first surface and a second surface. The pressure introduction unit is formed of metal having a through hole that penetrates a first surface and a second surface. The resin case has a signal terminal that extracts an electrical signal from the semiconductor pressure sensor chip. Further, the pressure introduction unit has a stepped portion protruding outward in an end portion of the pressure introduction unit on an opened end side in which the through hole is opened and a protruding portion protruding from the stepped portion to the base member side. When forming the pressure introduction unit, firstly, a step of fixing one end portion of a cylindrical metal bar having a span the same as the span of the protruding portion of the pressure introduction unit, and causing the other end portion of the metal bar to protrude from a flat surface of a first die, is carried out. Next, a step of sandwiching the other end portion of the metal bar protruding from the flat surface of the first die between the flat surface of the first die and a flat surface of a second die opposing the flat surface of the first die, thereby applying pressure, and causing plastic deformation of the other end portion of the metal bar until the span thereof is the same as the span of the stepped portion of the pressure introduction unit, is carried out.

According to the invention, the external dimensions of a pressure introduction unit can be reduced, in a state wherein the strength of the pressure introduction unit is maintained, by the wall thickness of a protruding portion of the pressure introduction unit being less than the height of a stepped portion. Therefore, the amount of the pressure introduction unit metal material used can be reduced. Also, according to the invention, even when the external dimensions of the pressure introduction unit are reduced, the pressure introduction unit is integrated with a resin case in a state wherein at least corner portions on an opened end side of an end portion of the stepped portion of the pressure introduction unit are covered by the resin case, because of which it does not happen that the pressure introduction unit falls out of the resin case due to stress exerted on the pressure introduction unit. Consequently, using a pressure introduction unit with reduced external dimensions, a pressure sensor cell with excellent pressure resistance and high reliability can be fabricated (manufactured). Also, according to the invention, a capacitor can be embedded in an empty space in the resin case, because of which the external dimensions of the pressure sensor cell can be maintained at the same extent as those to date, even when the capacitor is mounted. Therefore, a pressure sensor device can be assembled in the same way as to date using an existing manufacturing process, and there is no need to introduce new equipment for manufacturing the pressure sensor device.

According to the pressure sensor device and pressure sensor device manufacturing method according to the invention, an advantage is achieved in that cost can be reduced.

BRIEF DESCRIPTION OF THE DRAWINGS

FIGS. 7A to 7C are sectional views showing states partway through the manufacture of a pressure sensor cell according to the third embodiment;

DETAILED DESCRIPTION OF THE INVENTION

Hereafter, referring to the attached drawings, a detailed description will be given of preferred embodiments of a pressure sensor device and pressure sensor device manufacturing method according to the invention. In the following description of the embodiments and in the attached drawings, the same reference signs are given to the same configurations, and redundant descriptions are omitted.

First Embodiment

Figure 1:
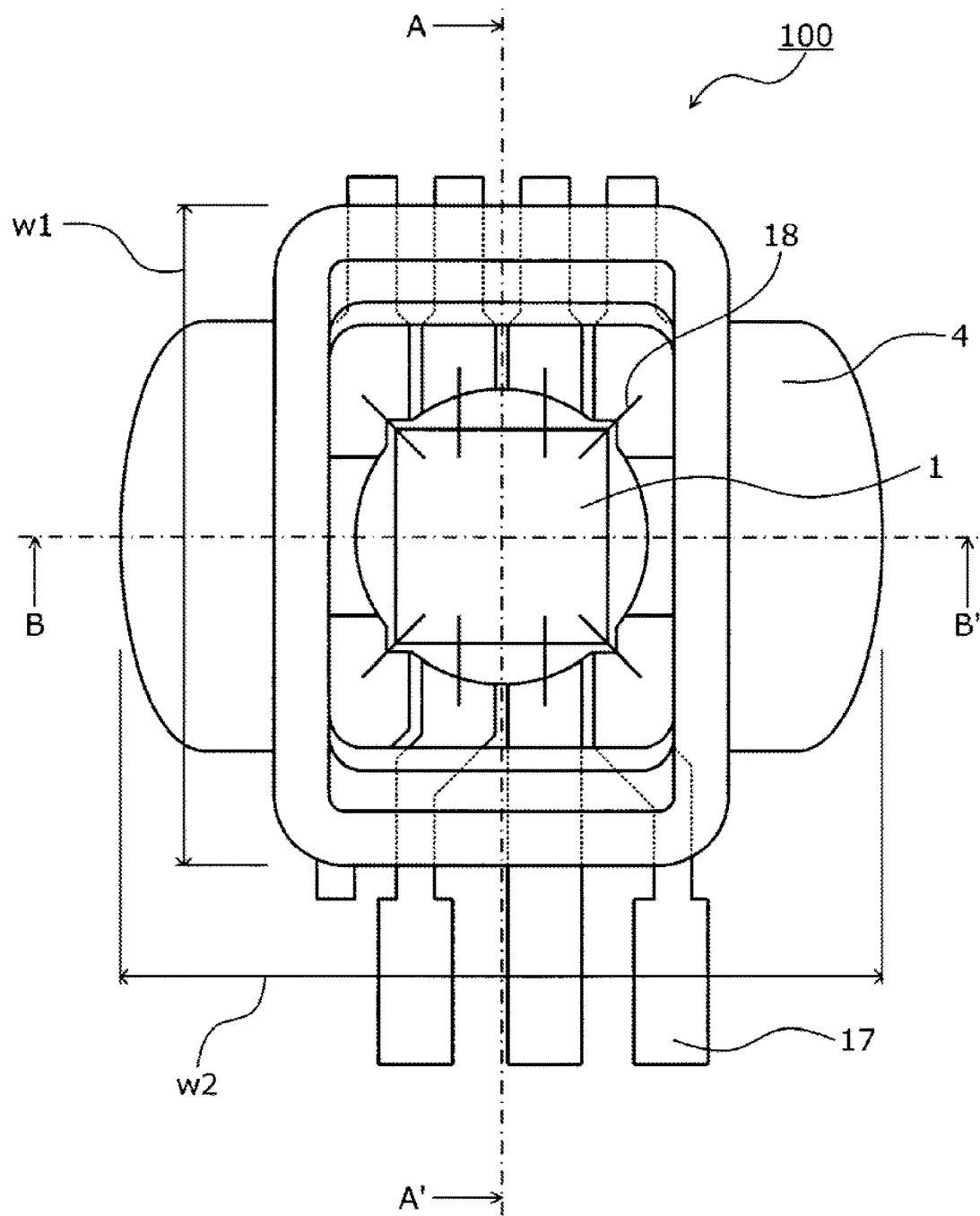
FIG. 1 is a plan view showing the configuration of a pressure sensor cell according to a first embodiment.
Figure 2:
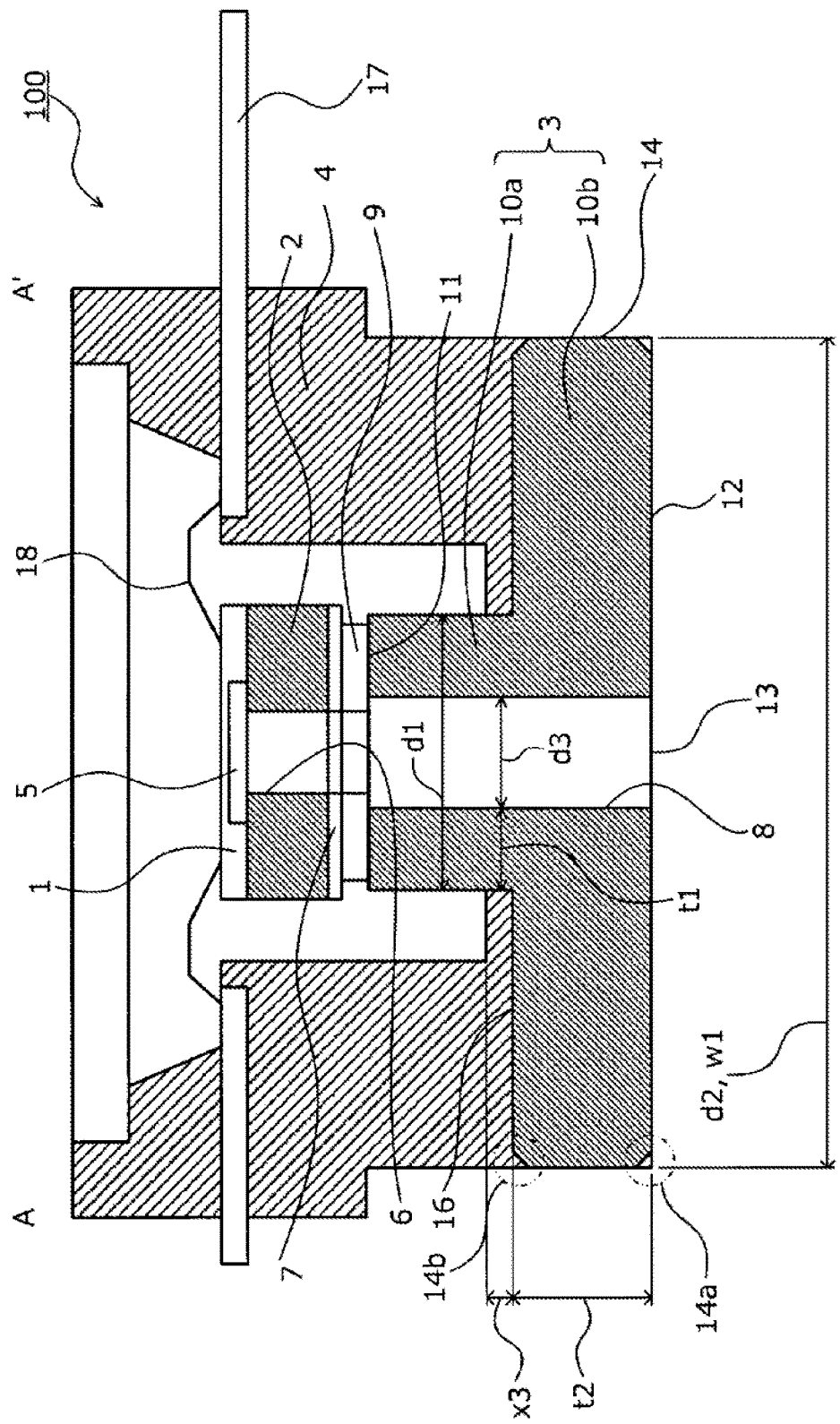
FIG. 2 is a sectional view showing the sectional structure along a cutting line A-A' of FIG. 1.
Figure 3:
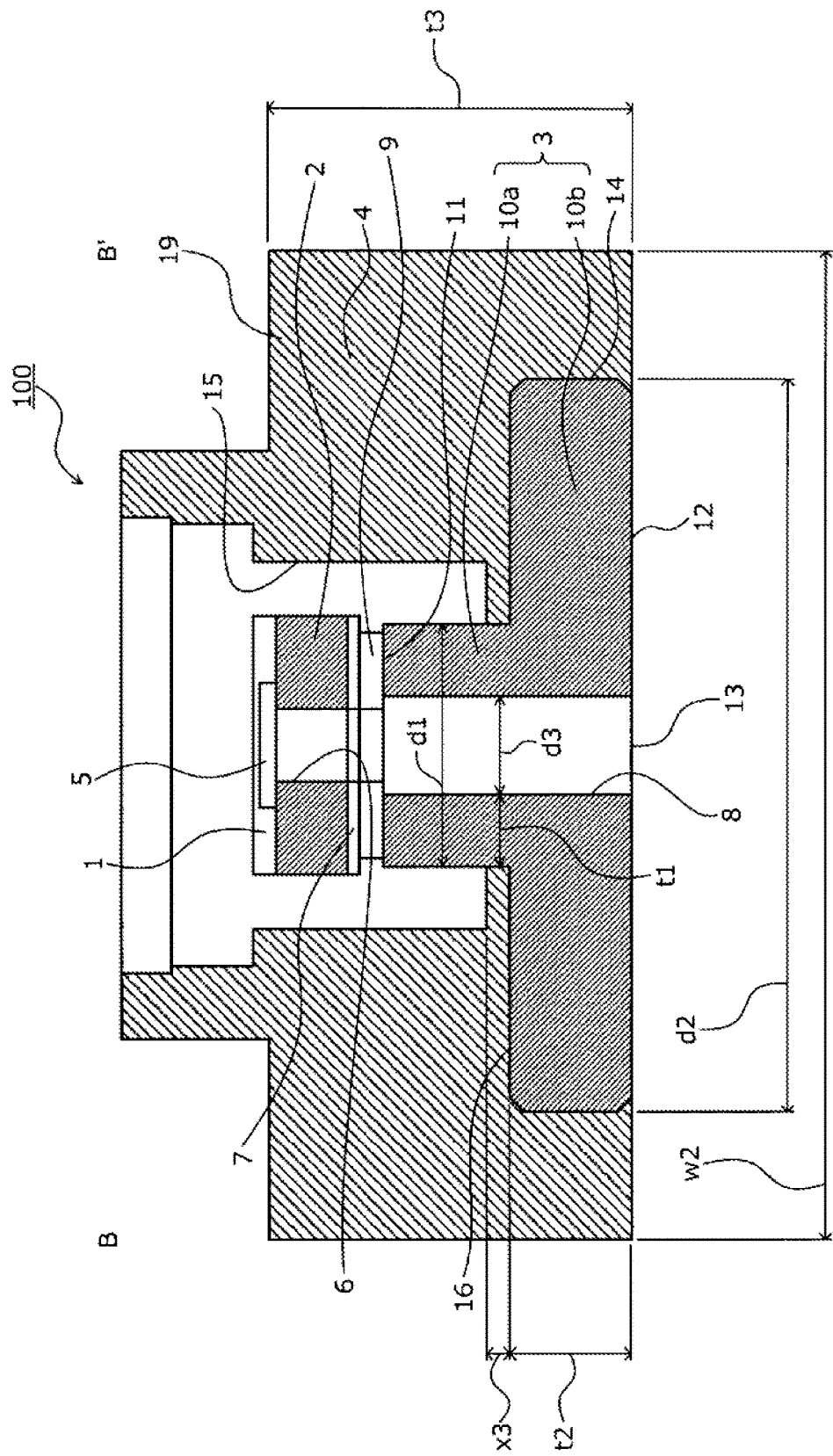
FIG. 3 is a sectional view showing the sectional structure along a cutting line B-B' of FIG. 1.

A description will be given of the configuration of a pressure sensor cell according to a first embodiment. FIG. 1 is a plan view showing the configuration of a pressure sensor cell according to a first embodiment. FIG. 2 is a sectional view showing the sectional structure along a cutting line A-A' of FIG. 1. FIG. 3 is a sectional view showing the sectional structure along a cutting line B-B' of FIG. 1. The cutting line A-A' is a cutting line parallel to the direction of extension of a signal terminal (for example, a lead frame) 17 integrally molded (insert molded) to a resin case 4 and leading to the exterior. The cutting line B-B' is a cutting line perpendicular to the cutting line A-A'. As shown in FIGS. 1 to 3, a pressure sensor cell 100 includes a pressure sensor chip 1, a base member 2, a metal pipe member 3, and the resin case 4.

The pressure sensor chip 1 has a diaphragm 5, which is a pressure receiving portion formed by carrying out indentation processing from a first surface (the lower surface in FIG. 1) of, for example, a semiconductor silicon chip. The pressure sensor chip 1 receives pressure on the diaphragm 5. Also, at least four gauges (not shown) formed of diffused resistors are formed in places on a second surface (the upper surface in FIG. 1) of the semiconductor silicon chip corresponding to the back side of the diaphragm 5. The gauges have a function of converting into a resistance value warping occurring in the second surface of the semiconductor silicon chip when pressure is applied to the indented surface of the diaphragm 5.

Also, although omitted from the drawings, a Wheatstone bridge circuit configured of the heretofore described gauges, a circuit that amplifies an output signal of the Wheatstone bridge circuit, a circuit that corrects sensitivity, a circuit that corrects offset, a circuit that corrects sensitivity and offset temperature characteristics, and the like, are formed on the pressure sensor chip 1. Also, a surge protection element and filter (omitted from the drawings), and the like, are also formed on the pressure sensor chip 1. The pressure sensor chip 1 may be made of another semiconductor material.

The base member 2, although not particularly limited, is made of, for example, a glass material, that is, Pyrex glass (registered trademark), Tempax glass, or the like. Also, a through hole 6 through which a pressure medium such as air or oil passes is provided in the center of the base member 2. The base member 2 and pressure sensor chip 1 are positioned so that the diaphragm 5 is aligned with the through hole 6, and joined using, for example, an epoxy adhesive.

A metal thin film 7 formed of three layers, those being, for example, chrome (Cr), platinum (Pt), and gold (Au) in order from the base member 2 side, is deposited on the surface of the base member 2 on the side joined to the metal pipe member 3, which is a pressure introduction unit. As the chrome layer on the base member 2 side has excellent adhesion with the glass material, it does not happen that the metal thin film 7 becomes detached. Also, the chrome layer and gold layer are prevented from coming into contact by the platinum layer. Also, the gold layer is suitable for joining the base member 2 and metal pipe member 3 across a gold/tin (Au/Sn) eutectic solder, high temperature solder, or the like.

The metal pipe member 3, although not particularly limited, is made of, for example, 42 alloy, and a nickel (Ni) plating (not shown), for example, is formed on the surface thereof. Also, the surface of the metal pipe member 3 may be a combination of a nickel plating and gold plating. By plating being formed on the metal pipe member 3, the strength of joining to the base member 2 increases. A through hole 8 through which a pressure medium such as air or oil passes is provided in the center of the metal pipe member 3.

The metal pipe member 3 and base member 2 are positioned so that the through holes 6 and 8 thereof are continuous, and joined using a metal material 9 such as a gold/tin eutectic solder or high temperature solder. The reason for using a gold/tin eutectic solder, high temperature solder, or the like, as the metal material 9 is so that the metal material 9 can withstand use under a high temperature. Also, as the Young's modulus of these solders is low, stress between the base member 2 and metal pipe member 3 can be relaxed.

The thermal expansion coefficients of the chrome, platinum, and gold configuring the metal thin film 7 are $4.5 \times 10^{-6}/°$ C., $9 \times 10^{-6}/°$ C., and $14.3 \times 10^{-6}/°$ C. respectively. Also, the thermal expansion coefficient of the glass material of the base member 2 is $3.2 \times 10^{-6}/°$ C. The thermal expansion coefficient of the 42 alloy material of the metal pipe member 3 is $4.3 \times 10^{-6}/°$ C. The base member 2 has, for example, an approximately cylindrical form, and the outer diameter (diameter) of the base member 2 is of the same extent as one side of the pressure sensor chip 1, which is, for example, approximately rectangular in planar form (for example, the diameter is 3 mm when the chip size is 3 mm squared).

Also, the metal pipe member 3 has an outwardly protruding stepped portion (flange portion) 10b from an end portion on a junction end 11 side joined to the base member 2 to another end portion, that is, an end portion on an opened end 12 side in which the through hole 8 of the metal pipe member 3 is opened. Outwardly means in a direction perpendicular to the direction in which the through hole 8 extends (a horizontal direction in the plane of FIGS. 2 and 3). In the following description, an aperture portion of the through hole 8 in the opened end 12 of the metal pipe member 3 is referred to as a pressure inlet 13.

It is preferable that corner portions 14a and 14b of an end portion 14 of the stepped portion 10b of the metal pipe member 3 are processed or chamfered into an arc form of a predetermined radius. The reason for this is as follows. When the metal pipe member 3 is integrally molded with the resin case 4, as will be described hereafter, heat-melted resin flows easily into the corner portion 14a on the pressure inlet 13 side of the end portion 14 of the stepped portion 10b of the metal pipe member 3. Therefore, the corner portion 14a on the pressure inlet 13 side of the end portion 14 of the stepped portion 10b of the metal pipe member 3 can easily be covered with the resin case 4, as will be described hereafter.

Also, by having the stepped portion 10b on the end portion on the opened end 12 side of the metal pipe member 3, the end portion on the junction end 11 side of the metal pipe member 3 forms a protruding portion 10a that protrudes from the stepped portion 10b to the base member 2 side. That is, the metal pipe member 3 has a reversed T-shape sectional form with the stepped portion 10b on the opened end 12 side as the horizontal bar and the protruding portion 10a on the junction end 11 side as the vertical bar. The protruding portion 10a and stepped portion 10b of the metal pipe member 3 are both of approximately cylindrical form, and have differing outer diameters (diameters) d1 and d2. That is, the metal pipe member 3 is of a circular pipe form having the stepped portion 10b on the end portion on the opened end 12 side.

It is preferable that the outer diameter d1 of the protruding portion 10a of the metal pipe member 3 is of the same extent as one side of the pressure sensor chip 1, which is, for example, approximately rectangular in planar form. By reducing the outer diameter d1 of the protruding portion 10a of the metal pipe member 3, the rigidity of the protruding portion 10a of the metal pipe member 3 can be reduced, because of which stress exerted on the protruding portion 10a of the metal pipe member 3 is relaxed. Therefore, stress generated in the protruding portion 10a of the metal pipe member 3 can be prevented from being transmitted to the pressure sensor chip 1. Therefore, the reliability of the pressure sensor chip 1 can be increased.

Also, it is preferable that a wall thickness t1 ($=(d1-d3)/2$) of the protruding portion 10a of the metal pipe member 3 is less than a thickness (height) t2 of the stepped portion 10b of the metal pipe member 3 (t1<t2). Therefore, even when the outer diameter d1 of the protruding portion 10a of the metal pipe member 3 is reduced, thus reducing the rigidity of the protruding portion 10a of the metal pipe member 3, the rigidity of the metal pipe 3 as a whole can be increased. The wall thickness of the protruding portion 10a of the metal pipe member 3 is the thickness (strip thickness) of the portion of the metal material sandwiched between the inner wall and outer wall of the protruding portion 10a of the metal pipe member 3. Reference sign d3 is the inner diameter (diameter) of the metal pipe member 3, that is, the diameter of the through hole 8. The outer diameter (diameter) d2 of the stepped portion 10b of the metal pipe member 3 is, for example, equal to or less than widths w1 and w2 of the resin case 4.

The resin case 4 has on one end portion side thereof a depressed portion 15. The pressure sensor chip 1 and base member 2 are housed in the depressed portion 15 of the resin case 4. Also, the signal terminal 17 leading to the exterior is integrally molded to the resin case 4, and the base end of the signal terminal 17 is exposed in the depressed portion 15 of the resin case 4. The portion of the signal terminal 17 exposed inside the depressed portion 15 and the pressure sensor chip 1 are electrically connected by bonding wire 18. Also, the metal pipe member 3 is integrally molded to the resin case 4, and a portion of the protruding portion 10a of the metal pipe member 3 on the base member 2 side is exposed inside the depressed portion 15 of the resin case 4.

It is preferable that the resin case 4 and metal pipe member 3 are integrated in a state wherein a portion of the protruding portion 10a of the metal pipe member 3 on the base member 2 side is distanced from the resin case 4. That is, it is preferable that a portion of the protruding portion 10a of the metal pipe member 3 on the base member 2 side is not in contact with the side wall of the depressed portion 15 of the resin case 4 (the inner side surface of the resin case 4). The reason for this is that as the pressure sensor chip 1 can be disposed distanced from the resin case 4, the pressure sensor chip 1 is unlikely to be subjected to stress caused by thermal contraction of the resin case 4, and long term reliability can thus be secured. The surface on the opened end 12 side of the metal pipe member 3, not being covered by the resin case 4, is exposed.

An end portion of the resin case 4 on the side opposite to that of the depressed portion 15 covers the metal pipe member 3 from a portion of the protruding portion 10a of the metal pipe member 3 on the stepped portion 10b side across a surface 16 of the stepped portion 10b on the side opposite to that of the pressure inlet 13. That is, the portion of the resin case 4 on the stepped portion 10b of the metal pipe member 3 has an approximately L-shaped sectional form, with a portion surrounding the protruding portion 10a of the metal pipe member 3 as the vertical bar and a portion on the surface 16 of the stepped portion 10b on the side opposite to that of the pressure inlet 13 as the horizontal bar. A portion of the protruding portion 10a of the metal pipe member 3 on the stepped portion 10b side and the resin case 4 are in contact, for example, to a predetermined height from the boundary with the stepped portion 10b (a width x3 of play arising between a die upper portion 51 and die lower portion 52, to be described hereafter). The resin case 4 coming into contact with the surface 16 of the stepped portion 10b on the side opposite to that of the pressure inlet 13 means that, when pressure is applied by a pressure medium introduced from the pressure inlet 13, the pressure acts so as to press the stepped portion 10b of the metal pipe member 3 against the resin case 4. Therefore, structural reliability with respect to pressure is high.

Also, the resin case 4 covers at least the corner portion 14a on the pressure inlet 13 side of the end portion 14 of the stepped portion 10b of the metal pipe member 3. Portions of the stepped portion 10b of the metal pipe member 3 other than the corner portions 14a and 14b of the end portion 14 may be exposed in the outer side surface of the resin case 4, or may be covered by the resin case 4. Therefore, there is an increase in reliability with respect to stress in a direction opposite to the direction in which pressure is applied owing to a pressure medium introduced from the pressure inlet 13. Therefore, the metal pipe member 3 can be prevented from falling out of the resin case 4.

The resin case 4, although not particularly limited, is such that, for example, the planar form is rectangular and, for example, four of the signal terminal 17 protrude outward from each of a pair of opposing sides. The signal terminals 17 aligned on one side of the resin case 4 are external connection terminals for extracting the output of the pressure sensor cell 100 to the exterior. The signal terminals 17 aligned on the other side of the resin case 4 are internal regulation terminals used when regulating the characteristics of the pressure sensor cell 100, and may be, for example, shorter than the external connection terminals. The signal terminals 17 are disposed to practically the same height as an electrode pad disposed on the outermost layer of the second surface of the semiconductor silicon chip.

It is preferable that the width (external dimension) w1 between the two end surfaces of the resin case 4 from which the signal terminal 17 protrudes is of practically the same extent as the outer diameter d2 of the stepped portion 10b of the metal pipe member 3 (w1≈d2). As it is sufficient that the width w1 between the two end surfaces of the resin case 4 from which the signal terminal 17 protrudes is of an extent such that at least the corner portion 14a on the pressure inlet 13 side of the end portion 14 of the stepped portion 10b of the metal pipe member 3 is covered, the size of the resin case 4 can be reduced by the width w1 being reduced as far as possible. Therefore, the size of a pressure sensor device in which the pressure sensor cell 100 is used can be reduced.

Meanwhile, the two end surfaces of the resin case 4 from which the signal terminal 17 does not protrude further outward than the stepped portion 10b of the metal pipe member 3. That is, the width (external dimension) w2 between the two end surfaces of the resin case 4 from which the signal terminal 17 does not protrude is greater than the outer diameter d2 of the stepped portion 10b of the metal pipe member 3 (w2>d2). The portion of the resin case 4 protruding further outward than the stepped portion 10b of the metal pipe member 3 forms a support portion 19 with which other members integrated with the resin case 4 (for example, a connector member 21 of a second embodiment to be described hereafter) are brought into contact.

A thickness (height) t3 of the portion of the resin case 4 protruding further outward than the stepped portion 10b of the metal pipe member 3 is determined by the height from the pressure inlet 13 to the signal terminal 17 (refer to a third embodiment, to be described hereafter), and is greater than the thickness t2 of the stepped portion 10b of the metal pipe member 3 (t3>t2). By increasing the thickness t3 of the portion of the resin case 4 protruding further outward than the stepped portion 10b of the metal pipe member 3, the size in the height direction of the resin case 4 increases, but the strength of the resin case 4 can be increased. Therefore, it is sufficient that the thickness t3 of the portion of the resin case 4 protruding further outward than the stepped portion 10b of the metal pipe member 3 is determined based on, for example, the stress exerted on the support portion 19 or the size of the resin case 4.

Although not particularly limited, when the chip size of the pressure sensor chip 1 is 9 mm squared, the metal pipe member 3 and resin case 4 have, for example, the following values. The outer diameter d1 of the protruding portion 10a of the metal pipe member 3 is 3 mm. The outer diameter d2 of the stepped portion 10b of the metal pipe member 3 is 9 mm. The inner diameter d3 of the metal pipe member 3 is 1.2 mm. The wall thickness t1 of the protruding portion 10a of the metal pipe member 3 is 0.9 mm. The thickness t2 of the stepped portion 10b of the metal pipe member 3 is 1.5 mm. The width w1 between the two end surfaces of the resin case 4 from which the signal terminal 17 protrudes (hereafter referred to as the short sides of the resin case 4) is 9 mm. The width w2 between the two end surfaces of the resin case 4 from which the signal terminal 17 does not protrude (hereafter referred to as the long sides of the resin case 4) is 12 mm.

The pressure sensor cell 100 with the heretofore described configuration is such that when a pressure medium is introduced from the pressure inlet 13 and pressure is received on the diaphragm 5 of the pressure sensor chip 1, the diaphragm 5 is distorted. Then, the gauge resistance value on the diaphragm 5 changes, and a voltage signal in accordance therewith is generated. The voltage signal is amplified by an amplifier circuit regulated by a regulator circuit such as a sensitivity correction circuit, offset correction circuit, or temperature characteristic correction circuit, and output from the pressure sensor chip 1. Then, the output signal is output via the bonding wire 18 to the signal terminal 17.

At this time, the pressure medium comes into contact only with the inner wall of the metal pipe member 3, the inner wall of the base member 2, and the diaphragm 5 of the pressure sensor chip 1. Consequently, whether the pressure medium is an air conditioner medium such as R134a gas or $CO_2$ gas, or oil, lubricating oil, or the like, high reliability can be obtained for a long period without the pressure sensor cell 100 deteriorating. Also, even when measuring high pressure, the area receiving the pressure (pressure receiving area) is only that of the diaphragm 5, because of which it is possible to dramatically reduce the structure size and materials of a pressure sensor device in which the pressure sensor cell 100 is used, thereby reducing the weight. Consequently, a low cost pressure sensor device can be realized.

As heretofore described, according to the first embodiment, the external dimensions of a metal pipe member can be reduced, in a state wherein the strength of the metal pipe member is maintained, by the wall thickness of a protruding portion of the metal pipe member being less than the height of a stepped portion. As heretofore described, a metal having a thermal expansion coefficient near the thermal expansion coefficient of silicon (Si), which is the semiconductor material of a pressure sensor chip, is used as the metal material of the metal pipe member, which is expensive, but by reducing the external dimensions of the metal pipe member, the amount of the metal pipe member metal material used can be reduced. Therefore, the material cost can be reduced.

Also, according to the first embodiment, even when the external dimensions of the metal pipe member are reduced, the metal pipe member is integrated with a resin case in a state wherein at least corner portions on a pressure inlet side of an end portion of the stepped portion of the metal pipe member are covered by the resin case, because of which it does not happen that the metal pipe member falls out of the resin case due to stress exerted on the metal pipe member. Consequently, using a metal pipe member such that a cost reduction is achieved by reducing the external dimensions, a pressure sensor cell with excellent pressure resistance and high reliability can be fabricated (manufactured) at low cost.

Also, according to the first embodiment, even when the external dimensions of the metal pipe member are reduced, the external dimensions of the pressure sensor cell can be maintained at practically the same extent as to date by causing the resin case integrated with the metal pipe member to protrude further outward than the stepped portion of the metal pipe member. Consequently, a pressure sensor device can be assembled in the same way as to date using an existing manufacturing process, and there is thus no need to introduce new equipment for manufacturing the pressure sensor device, because of which manufacturing cost can be reduced.

Also, according to the first embodiment, there is no need to use adhesive in order to join the resin case and metal pipe member, as the resin case and metal pipe member are integrally molded by resin molding (refer to the third embodiment). Also, there is no need to carry out a step for attaching the resin case and metal pipe member, or the like, as has been the case to date, and the number of steps can thus be reduced. Also, even when a high cost metal having a thermal expansion coefficient as near as possible to the thermal expansion coefficient of the pressure sensor chip is used as the metal material of a pressure introduction unit, the amount of the metal material used can be reduced, because of which a reduction in cost can be achieved. Consequently, a pressure sensor cell that is unlikely to be adversely affected by thermal stress accompanying thermal contraction of the pressure introduction unit or resin case can be fabricated at low cost.

Also, according to the first embodiment, the metal pipe member is integrated with the resin case in a state wherein a portion of the protruding portion on a base member side is detached from the resin case, because of which the pressure sensor chip and resin case can be separated by a predetermined distance. Therefore, thermal stress accompanying thermal contraction of the resin case can be prevented from reaching the pressure sensor chip. Consequently, a pressure sensor device having long-term reliability can be provided.

Second Embodiment

Figure 4:
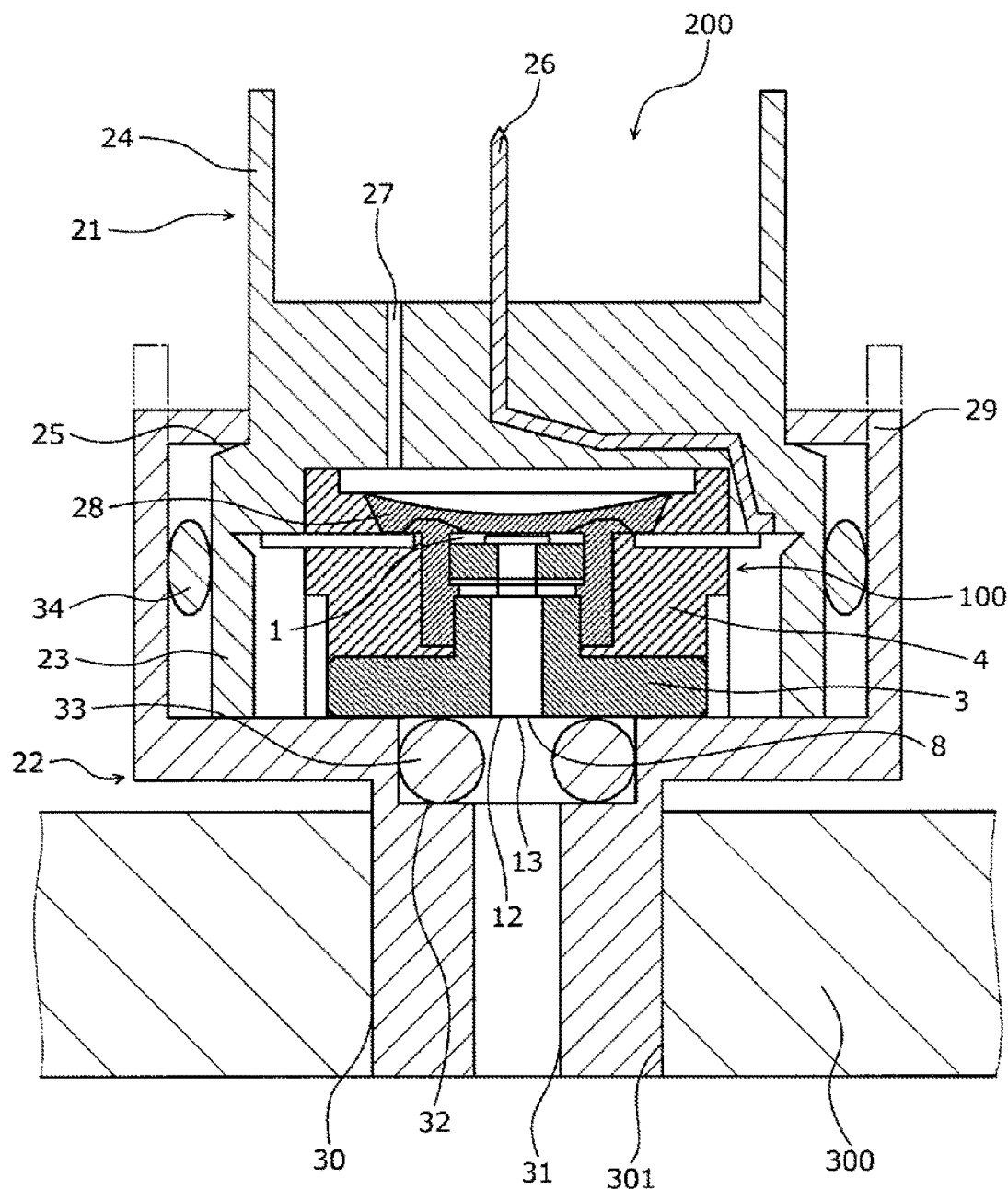
FIG. 4 is a sectional view showing the configuration of a pressure sensor device according to a second embodiment.
Figure 5:
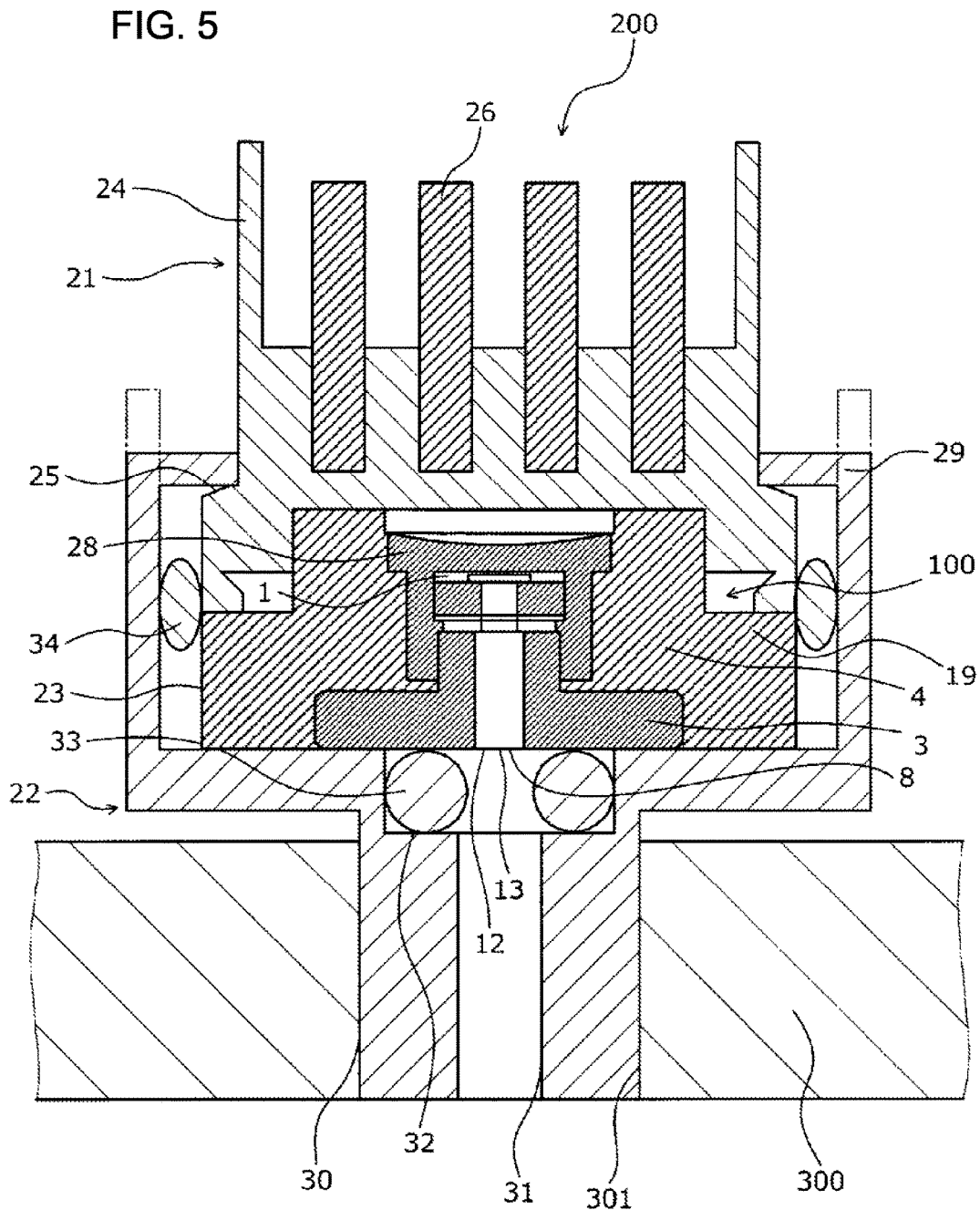
FIG. 5 is a sectional view showing the configuration of the pressure sensor device according to the second embodiment.

A description will be given of the configuration of a pressure sensor device according to a second embodiment. FIGS. 4 and 5 are sectional views showing the configuration of a pressure sensor device according to a second embodiment. FIGS. 4 and 5 show the configuration along cutting planes corresponding to the cutting lines A-A' and B-B' respectively of FIG. 1. As shown in FIGS. 4 and 5, a pressure sensor device 200 of the second embodiment is such that, by the pressure sensor cell 100 of the first embodiment being sandwiched by the connector member 21 and a coupling member 22, and the coupling member 22 being caulked, the pressure sensor cell 100, connector member 21, and coupling member 22 are integrated.

The connector member 21 is of a configuration wherein a housing portion 23 that houses the pressure sensor cell 100 and a socket portion 24 for extracting the output of the pressure sensor device 200 to the exterior are integrally molded. The socket portion 24 is narrower than the housing portion 23, and a stepped portion 25 is formed between the housing portion 23 and socket portion 24. A signal terminal 26 leading to the exterior is embedded in a partition portion between the housing portion 23 and socket portion 24. One end of the signal terminal 26 is exposed inside the housing portion 23, while the other end is exposed inside the socket portion 24.

The height of the housing portion 23 differs between the sides of the resin case 4 from which the signal terminal 17 protrudes and the sides from which the signal terminal 17 does not protrude. As shown in FIG. 4, the lower end of the housing portion 23 is in contact with the bottom surface of the coupling member 22 on the outer side of the metal pipe member 3 on the sides of the resin case 4 from which the signal terminal 17 protrudes, that is, along the long sides of the resin case 4. Meanwhile, as shown in FIG. 5, the lower end of the housing portion 23 is in contact with the support portion 19 of the resin case 4 on the sides of the resin case 4 from which the signal terminal 17 does not protrude, that is, along the short sides of the resin case 4. In this way, the connector member 21 is supported by the coupling member 22 and resin case 4.

The connector member 21 and pressure sensor cell 100 are integrated by the end surface of the pressure sensor cell 100 on the side opposite to the opened end 12 in which the pressure inlet 13 is opened being attached with a silicon adhesive, epoxy adhesive, or the like, to an end surface (disposition portion) of the partition portion between the housing portion 23 and socket portion 24 exposed inside the housing portion 23. By the pressure sensor cell 100 being attached to the contact member 21 in this way, reliability with respect to mechanical shock such as vibration or impact is further increased. Also, a base end portion of the signal terminal 26 exposed inside the housing portion 23 is electrically connected by laser welding to the signal terminal 17 of the pressure sensor cell 100.

A through hole 27 is provided in the partition portion between the housing portion 23 and socket portion 24. The through hole 27 is provided so that the space in the depressed portion 15 of the resin case 4 of the pressure sensor cell 100, in which the pressure sensor chip 1 is housed, is not in a hermetic state. When the through hole 27 is not provided, gas confined in the depressed portion 15 when the connector member 21 is attached to the pressure sensor cell 100 contracts due to temperature change, and the pressure sensor characteristics fluctuate.

By the through hole 27 being provided, passage in and out of gas is carried out via the through hole 27, even when gas inside the depressed portion 15 contracts due to temperature change. Therefore, no fluctuation occurs in the pressure sensor characteristics. Also, the depressed portion 15 in which the pressure sensor chip 1 is housed is filled with a gel 28 in order to protect, for example, the pressure sensor chip 1. Although the gel 28 may be omitted, it is effective in protecting the pressure sensor chip 1, because of which, preferably, it is good when the inside of the depressed portion 15 is filled with the gel 28.

The coupling member 22 has a fixing portion that fixes the housing portion 23 of the connector member 21, and is of a configuration wherein a storage portion 29, in which the pressure sensor cell 100 is stored, and a screw portion 30, which protrudes from a bottom portion of the storage portion 29 to the exterior of the storage portion 29, are integrally molded. A through hole 31 through which a pressure medium such as air or oil passes is provided in the center of the screw portion 30. The coupling member 22 and connector member 21 can be fixed by placing the storage portion 29 of the coupling member 22 over the housing portion 23 of the connector member 21, to which the pressure sensor cell 100 is attached, and caulking the leading end edge of the storage portion 29 with a machine or the like, so as to follow the stepped portion 25 of the connector member 21. The fixing may be carried out using a method other than caulking, for example, adhesion. The configuration is such that by the coupling member 22 and connector member 21 being fixed, the pressure inlet 13 of the pressure sensor cell 100 connects with the through hole 31 of the screw portion 30.

Further, by the screw portion 30 being screwed into a screw hole 301 penetrating a frame 300 in which a pressure medium is sealed, the pressure sensor device 200 is attached to the frame 300. In the attached state, the through hole 31 of the screw portion 30 connects to a space inside the frame 300 in which the pressure medium is sealed. Consequently, the pressure medium is led to the diaphragm 5 of the pressure sensor chip 1 through the through hole 31 of the screw portion 30 and the through holes 8 and 6 of the metal pipe member 3 and base member 2 of the pressure sensor cell 100. The frame 300 is, for example, a transmission oil seal block or hydraulic actuator block.

Also, a depressed portion 32 is formed in the bottom portion of the storage portion 29. The end portion on the pressure inlet 13 side of the metal pipe member 3 enters the depressed portion 32. Also, an O-ring 33, which is a sealing agent that seals the space between the metal pipe member 3 and coupling member 22, is fitted inside the depressed portion 32. The O-ring 33 seals the space between at least the bottom surface of the depressed portion 32 and the opened end 12 of the metal pipe member 3 inside the depressed portion 32 of the storage portion 29. Owing to the O-ring 33, a pressure medium led through the through hole 31 of the screw portion 30 to the metal pipe member 3 is prevented from flowing into a portion other than the through hole 8 of the metal pipe member 3. Also, sealing the space between the metal pipe member 3 and coupling member 22 by projection welding, laser welding, or the like, is also possible as a sealing agent.

Also, an O-ring 34 is provided in a space between the outer side surface of the housing portion 23 of the connector member 21 and the inner side surface of the storage portion 29 of the coupling member 22, sealing that space. Owing to the O-ring 34, a pressure medium is prevented from leaking to the exterior when the pressure medium leaks from the metal pipe member 3, when the pressure sensor chip 1 is damaged, when the junction interface between the pressure sensor chip 1 and base member 2 separates, or the like.

In this way, as the configuration is simple, member cost and assembly cost can be kept low. Also, as stress from the screw portion 30 when the pressure sensor device 200 is attached by being screwed into the frame 300 is transmitted to the pressure sensor chip 1 via the O-ring 33, the stress is relaxed by the O-ring 33. Consequently, the accuracy and reliability of a measurement signal increases. Also, the signal terminal 26 leading to the exterior is disposed on the side opposite to that of an aperture for introducing a pressure medium.

As heretofore described, according to the second embodiment, the same advantages as in the first embodiment can be obtained.

Third Embodiment

Figure 6:
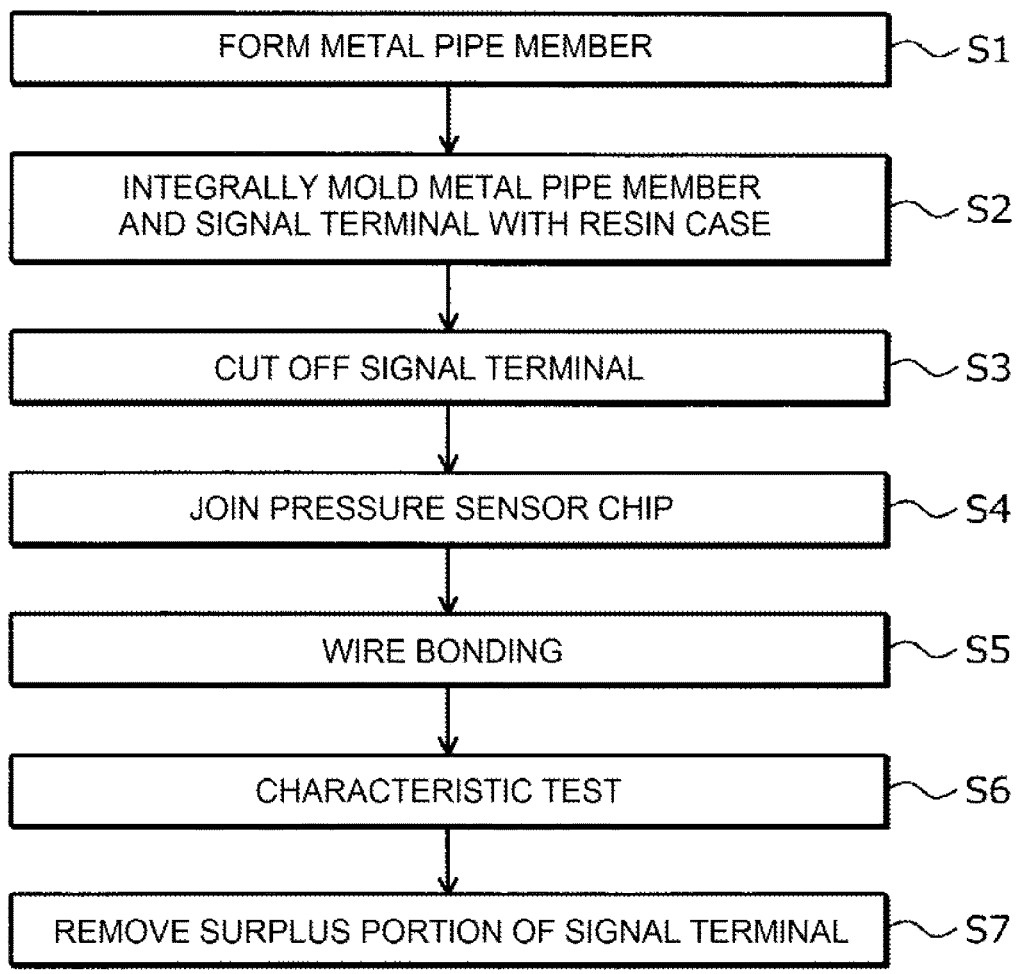
FIG. 6 is a flow chart showing an outline of a pressure sensor cell manufacturing method according to a third embodiment.
Figure 8:
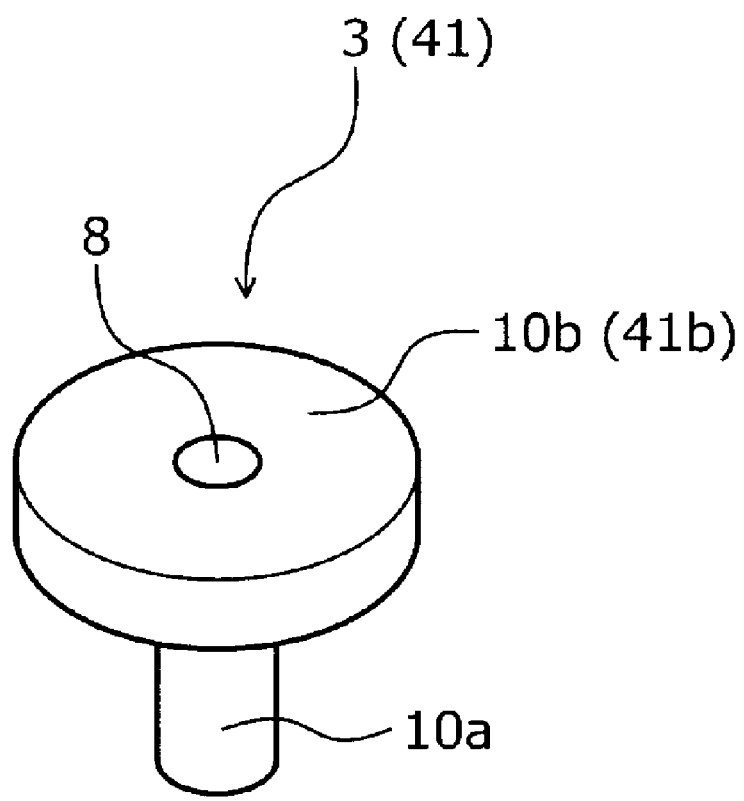
FIG. 8 is a perspective view showing a state partway through the manufacture of the pressure sensor cell according to the third embodiment.
Figure 9:
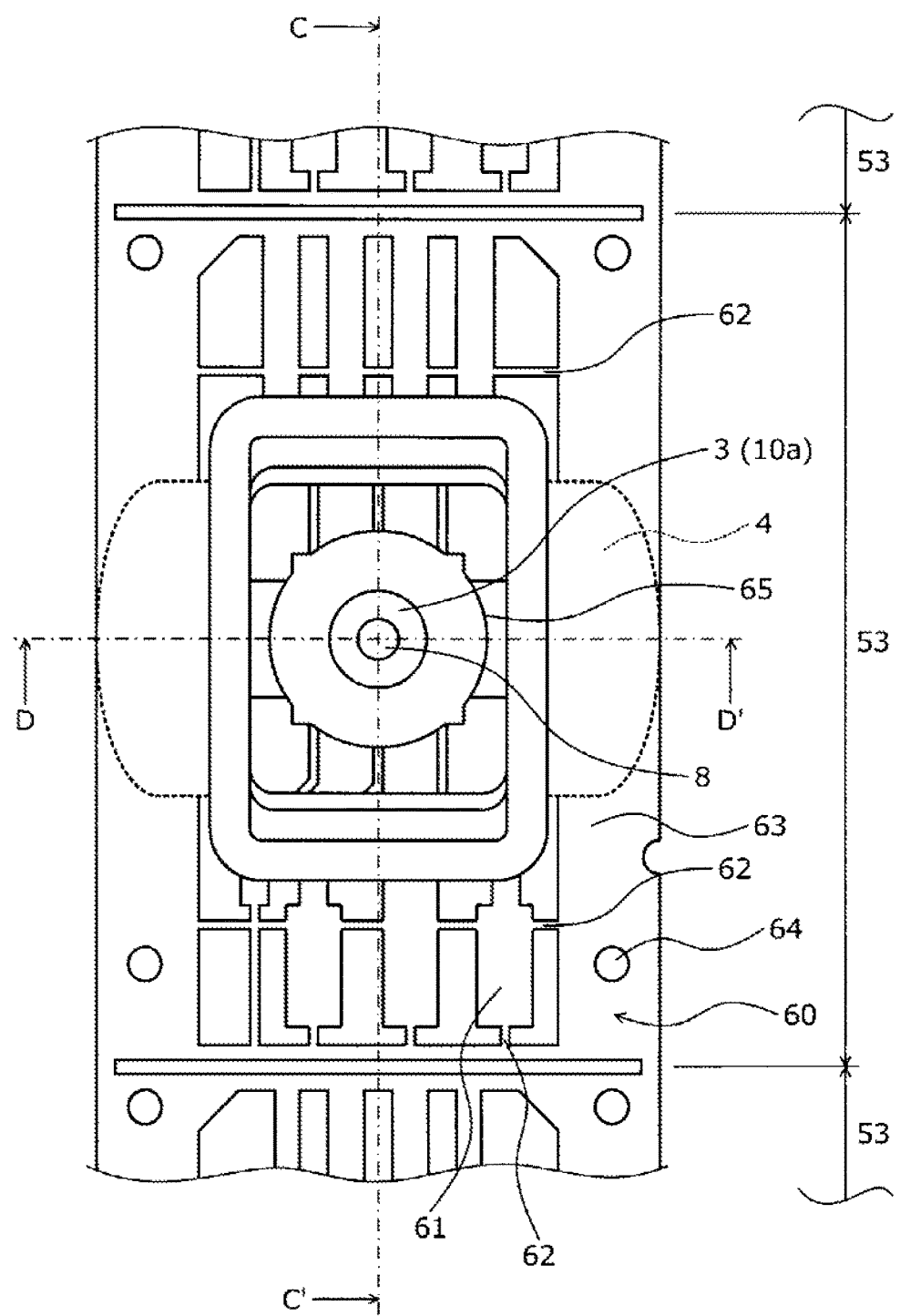
FIG. 9 is a plan view showing a state partway through the manufacture of the pressure sensor cell according to the third embodiment.
Figure 10:
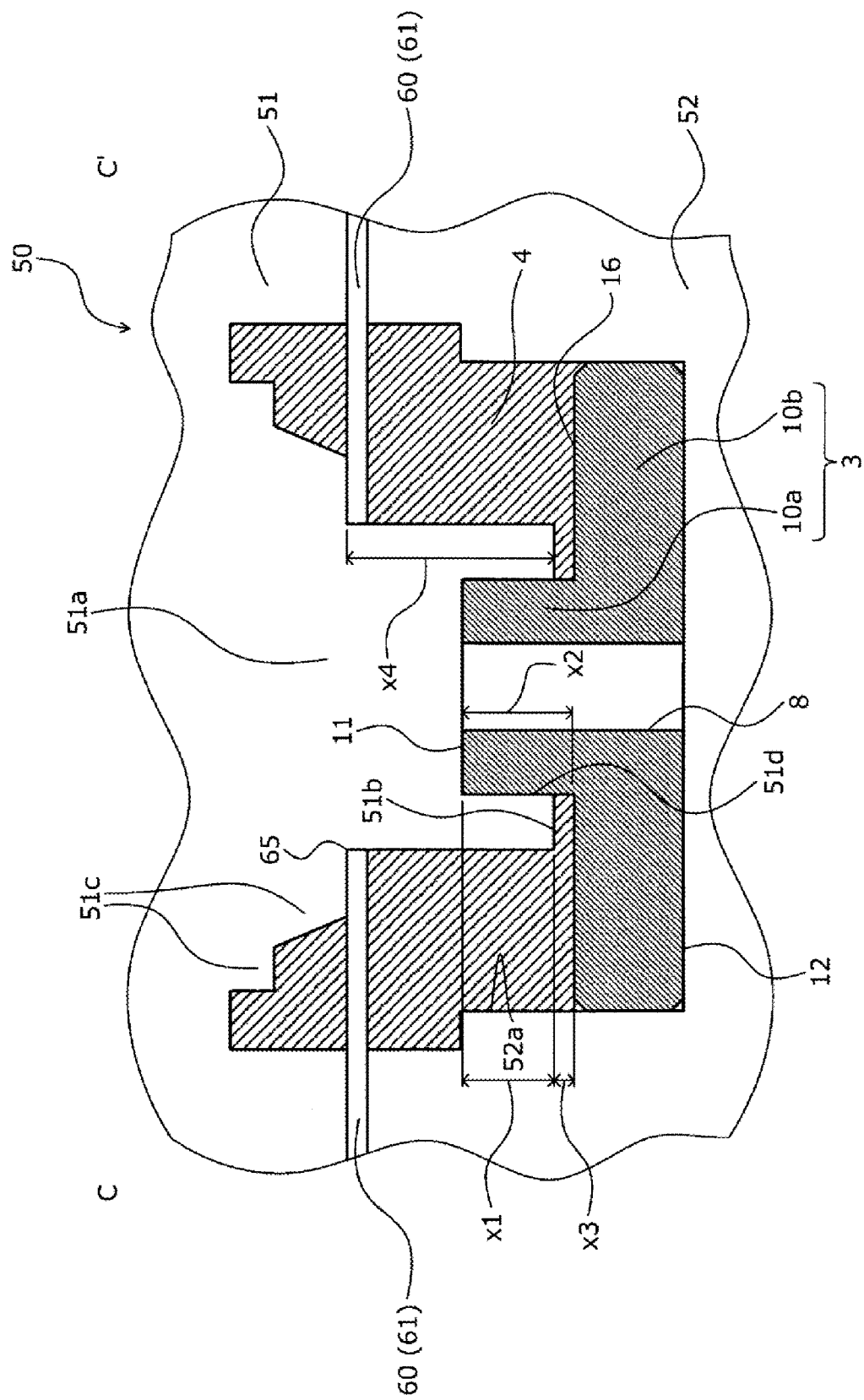
FIG. 10 is a sectional view showing the sectional structure along a cutting line C-C' of FIG. 9.
Figure 11:
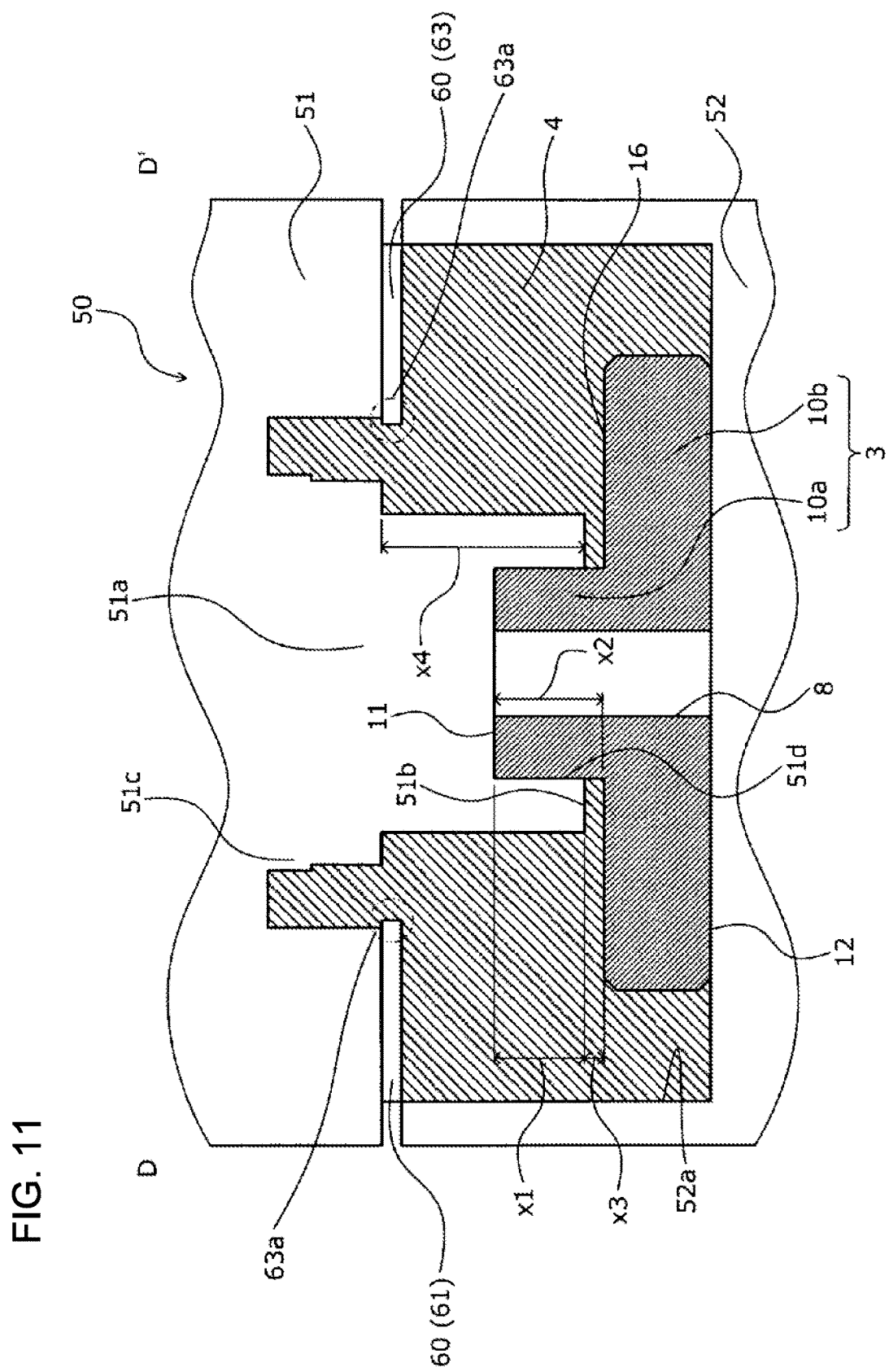
FIG. 11 is a sectional view showing the sectional structure along a cutting line D-D' of FIG. 9.

A description will be given of a method of manufacturing the pressure sensor cell 100 of the first embodiment as a pressure sensor cell manufacturing method according to the third embodiment. FIG. 6 is a flow chart showing an outline of the pressure sensor cell manufacturing method according to the third embodiment. FIGS. 7A to 7C are sectional views showing states partway through the manufacture of a pressure sensor cell according to the third embodiment. FIG. 8 is a perspective view showing a state partway through the manufacture of the pressure sensor cell according to the third embodiment. FIG. 9 is a plan view showing a state partway through the manufacture of the pressure sensor cell according to the third embodiment. FIG. 10 is a sectional view showing the sectional structure along a cutting line C-C' of FIG. 9. FIG. 11 is a sectional view showing the sectional structure along a cutting line D-D' of FIG. 9.

Firstly, the metal pipe member 3 is formed by, for example, heading processing (step S1). Specifically, a wire rod (round bar) 41 of a span (diameter) d11 the same as the outer diameter d1 of the protruding portion 10a of the metal pipe member 3 is prepared, as shown in FIG. 7A. Next, the wire rod 41 is cut into, for example, an easily-processed predetermined length. Next, one end portion 41a side of the wire rod 41 is fixed (clamped) to a movable die (supporting agent) 42 that can move in a direction parallel to a central line of the wire rod 41 (a vertical direction in FIGS. 7A to 7C). At this time, another end portion 41b side of the wire rod 41 is in a state protruding by a predetermined length from a flat surface 42a of the movable die 42. Arrows in FIGS. 7A to 7C indicate directions in which the movable die 42 can move.

Next, as shown in FIGS. 7B and 7C, pressure is applied by repeatedly moving the movable die 42 to strike the other end portion 41b of the wire rode 41 against a flat surface 43a of a fixed die (processing agent) 43, thereby causing plastic deformation thicker than the span d11 of the wire rod 41 (heading processing). That is, by the other end portion 41b of the wire rode 41 being repeatedly struck against the fixed die 43, the other end portion 41b of the wire rode 41 is crushed (trapped) between the flat surface 42a of the movable die 42 and the flat surface 43a of the fixed die 43, which are parallel to each other, whereby the outer diameter of the end portion 41b is widened until reaching the outer diameter d2 of the stepped portion 10b of the metal pipe member 3.

By the outer diameter of the other end portion 41b of the wire rod 41 being widened using heading processing in this way, the portion of the other end portion 41b of the wire rod 41 with the widened outer diameter forms the stepped portion 10b of the metal pipe member 3. Also, by the outer diameter of the other end portion 41b of the wire rod 41 being widened using heading processing, an end portion corner portion of the portion of the other end portion 41b of the wire rod 41 with the widened outer diameter naturally forms an arc form of a predetermined radius. That is, simply by forming the stepped portion 10b of the metal pipe member 3 using heading processing, the corner portions 14a and 14b of the end portion 14 of the stepped portion 10b can be formed in an arc form without carrying out an additional step.

Next, by the one end portion 41a side of the wire rod 41 being cut shorter, a portion that forms the protruding portion 10a of the metal pipe member 3 remains on the portion of the other end portion 41b of the wire rod 41 with the widened outer diameter. Next, as shown in FIG. 8, a through hole that passes along the central line of the wire rod 41, that is, the through hole 8 of the metal pipe member 3, is formed. The metal pipe member 3 is formed by the steps thus far. Next, the metal pipe member 3, signal terminal 17, and resin case 4 are integrally molded by resin molding (step S2). Specifically, as shown in FIGS. 9 to 11, the resin case 4 is formed using a die 50, which molds the depressed portion 15 and external aspect of the resin case 4, and a metal plate 60 patterned so that the signal terminals 17 are disposed in a predetermined pattern (the die 50 is not shown in FIG. 9).

The die 50 is formed of a male die upper portion 51 having a protruding portion 51a and a female die lower portion 52 having a depressed portion 52a opposing the protruding portion 51a. The protruding portion 51a of the die upper portion 51 molds the depressed portion 15 and depressed portion 15 side external aspect of the resin case 4. Specifically, the protruding portion 51a of the die upper portion 51 is formed by, for example, cylinders having a circular top surface 51b of a diameter smaller than the sides of the bottom surface of an approximately rectangular column being stacked concentrically on the rectangular column, forming an approximate frustum having one or more of a stepped portion 51c on a side surface. A depressed portion 51d having a span (diameter) of the same extent as the outer diameter d1 of the protruding portion 10a of the metal pipe member 3 is provided in the top surface 51b of the protruding portion 51a of the die upper portion 51. The depressed portion 52a of the die lower portion 52 molds the external aspect of the resin case 4 on the side opposite to the depressed portion 15. Specifically, the depressed portion 52a of the die lower portion 52 has an approximately rectangular planar form.

The metal pipe member 3 is placed with the opened end 12 side down inside the depressed portion 52a of this kind of die lower portion 52. Then, the metal plate 60 is placed on the die lower portion 52, and the die upper portion 51 is fitted to the die lower portion 52 so as to sandwich the metal plate 60. At this time, the top surface 51b side of the protruding portion 51a of the die upper portion 51 is inserted into a second hole 65, to be described hereafter, of the metal plate 60, and the protruding portion 10a of the metal pipe member 3 is inserted into the depressed portion 51d of the top surface 51b of the die upper portion 51. A depth x1 of the depressed portion 51d of the top surface 51b of the die upper portion 51 is less than a height x2 of the protruding portion 10a of the metal pipe member 3 (x1<x2). That is, a portion of the protruding portion 10a of the metal pipe member 3 on the side to which the base member 2 is joined is not covered by the depressed portion 51d of the top surface 51b of the die upper portion 51. Therefore, the protruding portion 51a of the die upper portion 51 does not come into contact with the stepped portion 10b of the metal pipe member 3 when the die upper portion 51 is fitted to the die lower portion 52.

That is, an amount of play equivalent to a width (height) x3 (=x2−x1) is provided between the protruding portion 51a of the die upper portion 51 and the stepped portion 10b of the metal pipe member 3. Therefore, the metal plate 60 and die upper portion 51 can be stacked sequentially with no gap on the die lower portion 52, regardless of the dimensional accuracy of the die 50 and metal pipe member 3. Consequently, resin case 4 formation defects can be reduced. A resin case 4 formation defect refers to a state wherein the resin case 4 cannot be housed in the connector member 21, such as the external aspect of the resin case 4 being distorted due to resin protruding from the die 50, or the resin case 4 being higher than a predetermined height due to a gap occurring between the die lower portion 52 and metal plate 60.

The metal plate 60 is a metal thin plate of approximately rectangular form wherein a multiple of a one cell section 53 having an approximately rectangular planar form, in which a multiple of the signal terminal 17 configuring one pressure sensor cell 100 are disposed in a predetermined pattern, are disposed in one direction (hereafter referred to as a longitudinal direction (a vertical direction in FIG. 9)). The metal plate 60 (specifically, a third portion 63, to be described hereafter) is used as a die in a portion in which the die upper portion 51 and die lower portion 52 are not in contact. Therefore, there is no need to increase the width of the metal plate 60 beyond the width of the resin case 4 in accordance with the positions of the signal terminal 17, as has been the case to date. That is, the width of the metal plate 60 in a direction perpendicular to the longitudinal direction (hereafter referred to as a lateral direction (a horizontal direction in FIG. 9)) can be reduced to the width w2 between the two end surfaces of the resin case 4 from which the signal terminal 17 does not protrude.

A multiple of first portions 61 that form the signal terminals 17 and second portions 62 that support the first portions 61 are formed in each cell section 53 of the metal plate 60. The multiple of first portions 61 are disposed in parallel in the longitudinal direction of the metal plate 60. The second portions 62 have an approximately linear planar form extending in a direction perpendicular to the first portions 61, and couple the first portions 61 to the third portion 63, to be described hereafter. Specifically, the second portions 62 couple first portions 61 neighboring in the lateral direction of the metal plate 60, and furthermore, may couple one portion of the first portions 61 to the third portion 63, or may couple each first portion 61 individually to the third portion 63.

Also, the third portion 63 is formed in parallel with the first portion 61 in each cell section 53 of the metal plate 60. The third portion 63 is disposed on the outermost side in the lateral direction of the metal plate 60 (that is, further to the outer side than the first portion 61), and is continuous across cell sections 53 neighboring in the longitudinal direction of the metal plate 60. The third portion 63 has, for example, an approximately linear planar form extending in the longitudinal direction of the metal plate 60. The third portion 63 functions as a frame supporting the multiple of first portions 61 via the second portions 62. Also, the third portion 63 has a function of supporting the resin case 4 integrally molded with the metal plate 60. For example, a first hole 64 is formed in the third portion 63 in each of portions corresponding to the four corners of the cell section 53. The resin case 4 can be conveyed by a fixed claw or the like of a conveyor hand being hooked in the first hole 64.

Furthermore, a second hole 65 having an approximately circular planar form with, for example, the central point of the cell section 53 as an approximate center is formed in each cell section 53 of the metal plate 60. The second hole 65 divides each first portion 61 (that is, signal terminal 17) into two. A portion of the first portion 61 on the second hole 65 side is the base end of the signal terminal 17. The top surface 51b side of the protruding portion 51a of the die upper portion 51 is inserted to a predetermined depth x4 into the second hole 65 of the metal plate 60 when the die upper portion 51 is fitted to the die lower portion 52 across the metal plate 60. FIGS. 10 and 11 show a state wherein the whole of the cylindrical portion forming the top surface 51b of the protruding portion 51a of the die upper portion 51 is inserted into the second hole 65 of the metal plate 60.

Resin heated to a softening temperature caused to flow into the inside of the die 50, wherein the protruding portion 51a of the die upper portion 51 is engaged with the depressed portion 52a of the die lower portion 52 across the metal plate 60 in this way, is hardened by cooling. The inside of the die 50 is a portion enclosed by the protruding portion 51a of the die upper portion 51, the third portion 63 of the metal plate 60, and the depressed portion 52a of the die lower portion 52. At this time, resin flows between the top surface 51b of the protruding portion 51a of the die upper portion 51 and the stepped portion 10b of the metal pipe member 3, and a region from a portion on the stepped portion 10b side of the protruding portion 10a of the metal pipe member 3 to the surface 16 on the side of the stepped portion 10b opposite to that of the opened end 12 is covered by the resin case 4.

Also, the third portion 63 of the metal plate 60 is disposed opposing the depressed portion 52a of the die lower portion 52. Therefore, softened resin flows between the depressed portion 52a of the die lower portion 52 and the third portion 63 of the metal plate 60, whereby the portion of the resin case 4 protruding further outward than the stepped portion 10b of the metal pipe member 3 is formed. That is, the third portion 63 of the metal plate 60 functions as a die for forming the portion of the resin case 4 protruding further outward than the stepped portion 10b of the metal pipe member 3. An inner side 63a of the third portion 63 of the metal plate 60 is in line contact with the outer side surface of the resin case 4 so as to slightly cut into the outer side surface, and is thereby fixed to the resin case 4.

Also, by stepped portions 51c of the protruding portion 51a of the die upper portion 51 being in contact with the first portion 61 (the base end of the signal terminal 17) of the metal plate 60, the base end of the signal terminal 17 is exposed in the depressed portion 15 of the resin case 4. Meanwhile, as softened resin flows into the vicinity of other stepped portions 51c of the protruding portion 51a of the die upper portion 51, portions of the first portion 61 of the metal plate 60 opposing the other stepped portions 51c are embedded inside the resin case 4. Then, the resin case 4 wherein the metal pipe member 3 and metal plate 60 are integrally molded is removed from the die 50. As no resin flows into a portion of the metal plate 60 in contact with the die upper portion 51 and die lower portion 52, this portion is exposed in the outer side of the resin case 4.

Next, the second portions 62 coupling first portions 61, or the first portion 61 and third portion 63, are cut, thereby decoupling each first portion 61 (signal terminal 17) (step S3). Next, the base member 2 is joined to the junction end 11 of the metal pipe member 3 using the metal material 9. Next, the pressure sensor chip 1 is joined to the base member 2 using, for example, an epoxy adhesive (step S4). Next, the electrode pad (not shown) of the pressure sensor chip 1 and the signal terminal 17 are electrically connected with the wire bonding 18 (step S5). Next, a general characteristic test is carried out (step S6). Next, by a surplus portion (that is, the third portion 63) of the metal plate 60 fixed to the resin case 4 being removed (step S7), only the first portion 61, which forms the signal terminal 17, remains of the metal plate 60, whereby the pressure sensor cell 100 shown in FIGS. 1 to 3 is completed.

As heretofore described, according to the third embodiment, the same advantages as in the first and second embodiments can be obtained. Also, according to the third embodiment, a metal pipe member is formed by heading processing using a round bar, because of which there is barely any generation of offcuts (portions thrown away generated when cutting out). When forming a metal pipe member by, for example, press processing using sheet-metal, all portions remaining after cutting a portion that forms the metal pipe member out of the sheet-metal are offcuts. Meanwhile, heading processing using a round bar is such that only a portion gouged out from the round bar when forming a through hole of the metal pipe member is an offcut. Therefore, by forming a metal pipe member by heading processing using a round bar, the amount of metal material used can be considerably reduced, and material efficiency can thus be increased. Consequently, cost can be reduced.

Also, according to the third embodiment, the thickness of a portion of a resin case protruding further outward than a stepped portion of the metal pipe member can be determined by the height from a pressure inlet of a signal terminal, because of which the metal pipe member and signal terminal can be integrally molded to the resin case using one portion of a metal plate that forms the signal terminal as a die. Therefore, when molding the resin case, there is no longer any need to insert a new die in order to determine the thickness of the portion of the resin case protruding further outward than the stepped portion of the metal pipe member, or to increase or reduce the width of the metal plate that forms the signal terminal in accordance with the disposition or size of the new die. Therefore, cost can be reduced.

Fourth Embodiment

Figure 12:
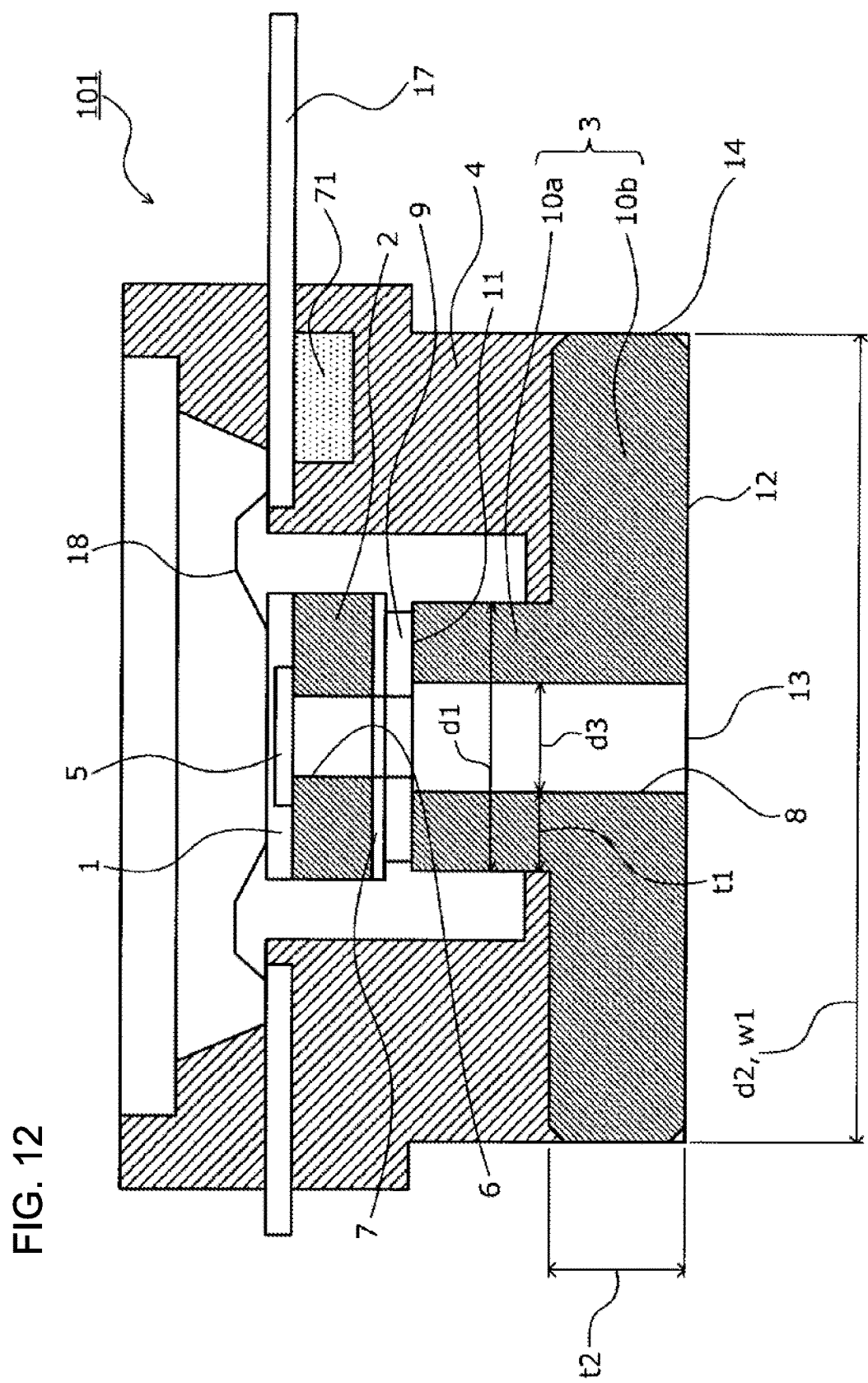
FIG. 12 is a sectional view showing the configuration of a pressure sensor cell according to a fourth embodiment.

A description will be given of the configuration of a pressure sensor cell according to a fourth embodiment. FIG. 12 is a sectional view showing the configuration of a pressure sensor cell according to the fourth embodiment. A pressure sensor cell 101 according to the fourth embodiment differs from the pressure sensor cell according to the first embodiment in that a chip capacitor 71 is embedded inside the resin case 4. The chip capacitor 71 has a function of eliminating, for example, an adverse effect of noise or a bulk current injection (BCI).

Specifically, the chip capacitor 71, for example, is integrally molded with the resin case 4, and embedded in a portion of the resin case 4 opposing the stepped portion 10b of the metal pipe member 3. Also, the chip capacitor 71 is joined using, for example, a conductive adhesive such as a solder cream to the signal terminal 17, which extracts an electrical signal from the pressure sensor chip 1 to the exterior. Specifically, it is preferable that at least two of the chip capacitor 71 are mounted, so that the chip capacitor 71 is joined across three of the signal terminal 17, which extract a power supply voltage signal, an output voltage signal, and a ground voltage signal of the pressure sensor chip 1.

With regard to a method of manufacturing the pressure sensor cell 101 according to the fourth embodiment, it is sufficient that, for example, the chip capacitor 71 is joined to the first portion 61 (signal terminal 17) of the metal plate 60 using, for example, a metal material such as solder before the metal pipe member 3, signal terminal 17, and resin case 4 are integrally molded in accordance with the pressure sensor cell manufacturing method according to the third embodiment.

As heretofore described, according to the fourth embodiment, the same advantages as in the first to third embodiments can be obtained. Also, according to the fourth embodiment, noise resistance can be increased by a chip capacitor being mounted, because of which, for example, electromagnetic compatibility (EMC) can be secured. Also, according to the fourth embodiment, the chip capacitor can be embedded in an empty space inside a resin case by being integrally molded to the resin case. Therefore, the chip capacitor can be mounted without changing the external dimensions of a pressure sensor cell. Consequently, a pressure sensor device can be assembled in the same way as to date using an existing manufacturing process, and there is no need to introduce new equipment for manufacturing the pressure sensor device, because of which cost can be reduced.

The invention heretofore described being changeable in various ways without departing from the scope of the invention, for example, the dimensions and the like of each portion in each of the heretofore described embodiments are variously set in accordance with the required specifications and the like. For example, in each of the heretofore described embodiments, a description is given taking as an example a resin case with which a signal terminal of a flat plate form is integrally molded but, this not being limiting, the thickness of a portion of the resin case protruding further outward than a stepped portion of a metal pipe member can be variously changed by, for example, bending the signal terminal up or down (in the direction in which a through hole of the metal pipe member extends) so that an irregularity is generated.

As heretofore described, the pressure sensor device and pressure sensor device manufacturing method according to the invention are useful in a pressure sensor device that measures pressure using semiconductor silicon, and are particularly suitable in a pressure sensor device that measures high pressure in the region of 0.5 MPa or more.

What is claimed is:

1. A pressure sensor cell, comprising:
   a semiconductor pressure sensor chip having a pressure receiving portion and for converting pressure into an electric signal;
   a base member having a through hole that penetrates a first surface of the base member and a second surface of the base member, the semiconductor pressure sensor chip being joined to the second surface so that the pressure receiving portion is aligned with the through hole;
   a metal material;
   a pressure introduction unit formed of metal and having a through hole that penetrates a first surface of the pressure introduction unit and a second surface of the pressure introduction unit, the second surface of the pressure introduction unit being joined across the metal material to the first surface of the base member so that the through hole of the pressure introduction unit connects with the through hole of the base member, the pressure introduction unit having
      a stepped portion protruding outward in an end portion of the pressure introduction unit on an opened end side in which the through hole of the pressure introduction unit is opened, and
      a protruding portion protruding from the stepped portion to a base member side, a wall thickness of the protruding portion being smaller than a height of the stepped portion; and
   a resin case having a signal terminal that extracts the electric signal from the semiconductor pressure sensor chip, the protruding portion being integrated with the resin case so that a surface of the stepped portion on a side, that is opposite to the opened end side, is in contact with the resin case;
   wherein the through hole of the pressure introduction unit is wider than the through hole of the base member.

2. The pressure sensor cell according to claim 1, wherein the pressure introduction unit is integrated with the resin case so as to be covered by the resin case from a portion of the protruding portion, which is on a stepped portion side, to the stepped portion.

3. The pressure sensor cell according to claim 1, wherein the pressure introduction unit is integrated with the resin case so that a portion of the protruding portion, which is on the base member side, is distanced from the resin case to be free of any direct contact with the resin case.

4. The pressure sensor cell according to claim 1, wherein a corner portion of an end portion of the stepped portion is chamfered.

5. The pressure sensor cell according to claim 1, wherein a protruding part of the resin case in contact with the stepped portion protrudes further outward than an end surface of the stepped portion.

6. The pressure sensor cell according to claim 5, wherein the protruding part forms a support portion with which another member, which is integrated with the pressure introduction unit, comes into contact.

7. The pressure sensor cell according to claim 1, wherein the pressure introduction unit is made of a 42 alloy.

8. The pressure sensor cell according to claim 1, wherein the pressure introduction unit and the signal terminal are integrated with parts of the resin case by resin molding.

9. A pressure sensor device, comprising:
   the pressure sensor cell according to claim 1;
   another signal terminal;
   a connector member, including a disposition portion in which the pressure sensor cell is disposed, the connector member having
      one end electrically connected to the signal terminal of the pressure sensor cell, and
      another end insert molded with the other signal terminal so that the another signal terminal protrudes to an exterior;
   a coupling member including a screw portion having a through hole and a storage portion, having a fixing portion that fixes the connector member, the pressure sensor cell disposed in the connector member being stored in the storage portion; and
   a sealing agent disposed so that a space between the pressure introduction unit and the coupling member is sealed with the sealing agent, wherein
   the pressure sensor cell is disposed in the connector member so that a portion of the through hole in the first surface of the pressure introduction unit is opened,
   the signal terminal of the pressure sensor cell and the other signal terminal are electrically connected, and
   the through hole of the screw portion connects with the through hole of the pressure introduction unit.

10. The pressure sensor cell according to claim 1, wherein an outer surface of the protruding portion has a first portion and a second portion that are respectively not covered, and covered, by the resin case, a height of the first portion being larger than that of the second portion.

11. A pressure sensor cell, comprising:
   a semiconductor pressure sensor chip having a pressure receiving portion and for converting pressure into an electric signal;
   a base member having a through hole that penetrates a first surface of the base member and a second surface of the base member, the semiconductor pressure sensor chip being joined to the second surface so that the pressure receiving portion is aligned with the through hole;
a metal material;
a pressure introduction unit formed of metal and having a through hole that penetrates a first surface of the pressure introduction unit and a second surface of the pressure introduction unit, the second surface of the pressure introduction unit being joined across the metal material to the first surface of the base member so that the through hole of the pressure introduction unit connects with the through hole of the base member, the pressure introduction unit having a stepped portion protruding outward in an end portion of the pressure introduction unit on an opened end side in which the through hole of the pressure introduction unit is opened; and
a resin case having a signal terminal that extracts the electric signal from the semiconductor pressure sensor chip,
the pressure introduction unit being integrated with the resin case so that
a surface of the stepped portion on a side opposite to the opened end side is in contact with the resin case, and
at least one corner portion of an end portion of the stepped portion is covered by the resin case, the at least one corner portion being on the opened end side.

12. The pressure sensor cell according to claim 11, wherein the pressure introduction unit has a protruding portion protruding from the stepped portion to a base member side.

13. The pressure sensor cell according to claim 12, wherein the pressure introduction unit is integrated with the resin case to be covered by the resin case from a portion of the protruding portion, which is on a stepped portion side, to the stepped portion.

14. The pressure sensor cell according to claim 12, wherein the pressure introduction unit is integrated with the resin case so that a portion of the protruding portion, which is on the base member side, is distanced from the resin case to be free of any direct contact with the resin case.

15. The pressure sensor cell according to claim 12, wherein the at least one corner portion is chamfered.

16. The pressure sensor cell according to claim 12, wherein a protruding part of the resin case in contact with the stepped portion protrudes further outward than an end surface of the stepped portion.

17. The pressure sensor cell according to claim 16, wherein the protruding part forms a support portion with which another member, which is integrated with the pressure introduction unit, comes into contact.

18. The pressure sensor cell according to claim 11, wherein
the pressure introduction unit further includes a protruding portion that protrudes from the stepped portion towards the base member, and
an outer surface of the protruding portion has a first portion and a second portion that are respectively not covered, and covered, by the resin case, a height of the first portion being larger than that of the second portion.

19. A pressure sensor cell, comprising:
a semiconductor pressure sensor chip having a pressure receiving portion and for converting pressure into an electric signal;
a base member having a through hole that penetrates a first surface of the base member and a second surface of the base member, the semiconductor pressure sensor chip being joined to the second surface so that the pressure receiving portion is aligned with the through hole;
a metal material;
a pressure introduction unit formed of metal and having a through hole that penetrates a first surface of the pressure introduction unit and a second surface of the pressure introduction unit, the second surface of the pressure introduction unit being joined across the metal material to the first surface of the base member so that the through hole of the pressure introduction unit connects with the through hole of the base member, the pressure introduction unit having a stepped portion protruding outward in an end portion of the pressure introduction unit on an opened end side in which the through hole of the pressure introduction unit is opened;
a resin case having a signal terminal that extracts the electric signal from the semiconductor pressure sensor chip, the pressure introduction unit being integrated with the resin case so that a surface of the stepped portion on a side opposite to the opened end side is in contact with the resin case; and
a capacitor connected to the signal terminal, the capacitor being embedded in a portion of the resin case opposing the stepped portion of the pressure introduction unit.

20. The pressure sensor cell according to claim 19, wherein
the pressure introduction unit further includes a protruding portion that protrudes from the stepped portion towards the base member, and
an outer surface of the protruding portion has a first portion and a second portion that are respectively not covered, and covered, by the resin case, a height of the first portion being larger than that of the second portion.

* * * * *